United States Patent
Yokouchi et al.

(10) Patent No.: US 10,572,111 B2
(45) Date of Patent: Feb. 25, 2020

(54) IMAGE DISPLAY CONTROL DEVICE, IMAGE DISPLAY CONTROL METHOD, IMAGE DISPLAY CONTROL PROGRAM, AND RECORDING MEDIUM HAVING THE PROGRAM STORED THEREON

(71) Applicant: FUJIFILM Corporation, Tokyo (JP)

(72) Inventors: Koji Yokouchi, Tokyo (JP); Xuebin Hu, Tokyo (JP); Hideo Segawa, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 284 days.

(21) Appl. No.: 15/638,379

(22) Filed: Jun. 30, 2017

(65) Prior Publication Data

US 2017/0308254 A1 Oct. 26, 2017

Related U.S. Application Data

(63) Continuation of application No. PCT/JP2015/086220, filed on Dec. 25, 2015.

(30) Foreign Application Priority Data

Feb. 4, 2015 (JP) .................................. 2015-020567

(51) Int. Cl.
*G06K 9/00* (2006.01)
*G06F 3/0484* (2013.01)
(Continued)

(52) U.S. Cl.
CPC .......... *G06F 3/0484* (2013.01); *G06F 3/0488* (2013.01); *G06F 3/0677* (2013.01);
(Continued)

(58) Field of Classification Search
None
See application file for complete search history.

(56) References Cited

U.S. PATENT DOCUMENTS 7,822,233 B2   10/2010   Nagaoka et al.
2005/0105806 A1*  5/2005   Nagaoka ............... G06F 16/583
                                                382/224
(Continued)

FOREIGN PATENT DOCUMENTS

JP   2005332381   12/2005
JP   2007179198    7/2007
(Continued)

OTHER PUBLICATIONS

"International Search Report (Form PCT/ISA/210) of PCT/JP2015/086220", dated Apr. 5, 2016, with English translation thereof, pp. 1-4.

(Continued)

*Primary Examiner* — Sean M Conner
(74) *Attorney, Agent, or Firm* — JCIPRNET

(57) ABSTRACT

A facial image that a user desires to look for from among a plurality of detected facial image displayed in a first facial image display area is clicked, and the clicked facial image is displayed in a third facial image display area. A facial image that is similar to the facial image displayed in the third facial image display area and is suitable for printing is looked for among from the plurality of detected facial image displayed in the first facial image display area, and displayed in a second facial image display area. The user clicks the facial image of the person which the user desires to look for from among the facial images displayed in the second facial image display area. The clicked facial image is displayed in the third facial image display area.

26 Claims, 40 Drawing Sheets

(51) Int. Cl.
  *G06T 11/60* (2006.01)
  *G06F 16/50* (2019.01)
  *G06F 3/0488* (2013.01)
  *G06F 3/06* (2006.01)
  *G06F 3/03* (2006.01)

(52) U.S. Cl.
  CPC ......... *G06F 16/50* (2019.01); *G06K 9/00281* (2013.01); *G06K 9/00288* (2013.01); *G06K 9/00677* (2013.01); *G06T 11/60* (2013.01); *G06F 3/0304* (2013.01); *G06F 2203/011* (2013.01)

(56) References Cited

U.S. PATENT DOCUMENTS

| | | | |
|---|---|---|---|
| 2007/0258645 A1* | 11/2007 | Gokturk | G06K 9/00288 382/190 |
| 2011/0052069 A1 | 3/2011 | Nakabayashi et al. | |
| 2012/0008837 A1* | 1/2012 | Goldberg | G06K 9/00295 382/118 |
| 2013/0022244 A1 | 1/2013 | Nagata et al. | |

FOREIGN PATENT DOCUMENTS

| | | | |
|---|---|---|---|
| JP | 2007179198 A | * | 7/2007 |
| JP | 2011048668 | | 3/2011 |
| JP | 2013161394 | | 8/2013 |
| JP | 5388399 | | 1/2014 |
| JP | 5485254 | | 5/2014 |
| JP | 2014089625 | | 5/2014 |
| JP | 2014089625 A | * | 5/2014 |
| JP | 2014102715 | | 6/2014 |
| WO | 2012114727 | | 8/2012 |
| WO | 2013069605 | | 5/2013 |

OTHER PUBLICATIONS

"Written Opinion of the International Searching Authority (Form PCT/ISA/237) of PCT/JP2015/086220", dated Apr. 5, 2016, with English translation thereof, pp. 1-11.

* cited by examiner

FIG. 6

RELATED INFORMATION TABLE

| FACIAL IMAGE | ORGIGINAL IMAGE | COORDINATES OF FACE IN ORIGINAL IMAGE | SET IMAGE |
|---|---|---|---|
| F1 | ORGIGINAL IMAGE 1 | (x1, y1), (w1, h1) | Y |
| F2 | ORGIGINAL IMAGE 1 | (x2, y2), (w2, h2) | Y |
| F3 | ORGIGINAL IMAGE 2 | (x3, y3), (w3, h3) | N |
| ⋮ | ⋮ | ⋮ | ⋮ |

FIG. 7

DEGREE OF SUITABILITY TABLE

| ORGIGINAL IMAGE | FACIAL IMAGE | FOCUS POINT | SIZE POINT | DEGREE OF SUITABILITY POINT |
|---|---|---|---|---|
| ORGIGINAL IMAGE 1 | F1 | 50 | 20 | 70 |
| | F2 | 90 | 70 | 160 |
| ORGIGINAL IMAGE 2 | F3 | 95 | 50 | 145 |
| ⋮ | ⋮ | ⋮ | ⋮ | ⋮ |

FIG. 8

DEGREE OF FACE SIMILARITY TABLE

| FACIAL IMAGE | F1 | F2 | F3 | F4 | F5 | F6 | - - - |
|---|---|---|---|---|---|---|---|
| F1 | 1.0 | 0.2 | 0.4 | 0.5 | 0.88 | 0.92 | - - - |
| F2 | — | 1.0 | 0.6 | 0.7 | 0.3 | 0.2 | - - - |
| F3 | — | — | 1.0 | 0.3 | 0.5 | 0.6 | - - - |
| F4 | — | — | — | 1.0 | 0.6 | 0.7 | - - - |
| F5 | — | — | — | — | 1.0 | 0.95 | - - - |
| F6 | — | — | — | — | — | 1.0 | - - - |
| ⋮ | ⋮ | ⋮ | ⋮ | ⋮ | ⋮ | ⋮ | - - - |

FIG. 18

SPECIFIC FACE TABLE

| USER | SPECIFIC FACIAL IMAGE |
|---|---|
| USER 1 | F1, - - - |
| USER 2 | - - - - |
| ⋮ | ⋮ |

FIG. 19

DETECTED FACIAL IMAGE TABLE

| DETECTED FACIAL IMAGE | F2 | F3 | F4 | F5 | F6 | | |
|---|---|---|---|---|---|---|---|
| DEGREE OF FACIAL IMAGE SIMILARITY TO FACIAL IMAGE F1 | 0.2 | 0.4 | 0.5 | 0.88 | 0.92 | - - | - - |
| DEGREE OF SUITABILITY POINT | 160 | 145 | 110 | 40 | 180 | - - | - - |
| DEGREE OF PRIORITY POINT | 32 | 58 | 55 | 35.2 | 165.6 | - - | - - |
| PRIORITY | 34 | 14 | 15 | 32 | 1 | - - | - - |
| SIMILAR FACIAL IMAGE CANDIDATE | NO | YES | YES | NO | YES | - - | - - |

PRINT ORDER TABLE (USER 1)

| FACIAL IMAGE | ORDER | SIZE | POSITION | BLURRINESS | DEGREE OF SMILING | DEGREE OF SUITABILITY |
|---|---|---|---|---|---|---|
| F2 | PRESENCE | - - - | - - - | - - - | - - - | - - - |
| FB2 | ABSENCE | - - - | - - - | - - - | - - - | - - - |
| FB4 | PRESENCE | - - - | - - - | - - - | - - - | - - - |
| FB5 | PRESENCE | - - - | - - - | - - - | - - - | - - - |
| ⋮ | ⋮ | ⋮ | ⋮ | ⋮ | ⋮ | ⋮ |

IMAGE DISPLAY CONTROL DEVICE, IMAGE DISPLAY CONTROL METHOD, IMAGE DISPLAY CONTROL PROGRAM, AND RECORDING MEDIUM HAVING THE PROGRAM STORED THEREON

CROSS-REFERENCE TO RELATED APPLICATIONS

This application is a Continuation of PCT International Application No. PCT/JP2015/086220 filed on Dec. 25, 2015, which claims priority under 35 U.S.C. § 119(a) to Japanese Patent Application No. 2015-020567 filed on Feb. 4, 2015. Each of the above application(s) is hereby expressly incorporated by reference, in its entirety, into the present application.

BACKGROUND OF THE INVENTION

1. Field of the Invention

The present invention relates to an image display control device, an image display control method, and an image display control program, and a recording medium having an image display control program stored thereon.

2. Description of the Related Art

A school photo management system that manages photos taken in events at a school has been proposed (JP2014-102715A). In this school photo management system, a facial image recognition process is performed by registering facial images in advance, and images to be viewed are narrowed down to images including a face with high similarity to the facial image. Further, there are a technology for performing face detection and face authentication on a photo to assist in management of photos (JP5388399B and JP5485254B), and a technology for calculating and correcting a degree of blurring and shaking of an image (see JP2005-332381A). Further, there is a technology for specifying a person through facial image recognition and displaying relevant images (JP2013-161394A).

SUMMARY OF THE INVENTION

However, the technology described in JP2014-102715A is intended to present only the same person to parents using a face recognition technology, and does not present required images in a case where accurate authentication cannot be performed. Further, the technologies described in JP5388399B and JP5485254B organize photos using a degree of similarity, and do not consider whether an image is suitable for printing. Further, the technology described in JP2005-332381A is only intended to correct blurring of an image. Further, the technology described in JP2013-161394A is intended to merely display all relevant images, and does not consider that images suitable for printing are looked for.

An object of the present invention is to look for an image of a desired person among from a large number of images, and look for an image suitable for printing relatively simply.

An image display control device according to the present invention comprises a first display control unit for causing at least one or more facial images among a plurality of detected facial images detected from a plurality of original images to be displayed in a first facial image display area; a first specific facial image determination unit for determining a facial image designated by a first facial image designation unit from among the at least one or more facial images displayed in the first facial image display area by the first display control unit, as a specific facial image that is used to look for a facial image similar to the designated facial image; a second display control unit for causing the detected facial images with a degree of priority calculated for the plurality of detected facial images from a degree of similarity between the respective detected facial images of the plurality of detected facial images and the specific facial image determined by the first specific facial image determination unit and a degree of suitability indicating a degree suitable for printing, the degree of priority being a degree of priority up to a predetermined number, to be displayed as similar facial image candidates in a second facial image display area; a second specific facial image determination unit for determining the facial image designated by a second facial image designation unit among the facial images displayed in the second facial image display area by the second display control unit, as the specific facial images (in addition to the specific facial image determined by the first specific facial image determination unit); a first updating unit for causing facial images excluding the facial image designated by the first facial image designation unit and the facial image displayed in the second facial image display area from the plurality of detected facial images to be a plurality of new detected facial images; and a control unit for causing the process of the second display control unit and the process of the second specific facial image determination unit to be repeated.

The present invention also provides an image display method suitable for the image display control device. That is, in this method, a first display control unit causes at least one or more facial images among a plurality of detected facial images detected from a plurality of original images to be displayed in a first facial image display area, a first specific facial image determination unit determines a facial image designated by a first facial image designation unit from among the at least one or more facial images displayed in the first facial image display area by the first display control unit, as a specific facial image that is used to look for a facial image similar to the designated facial image, a second display control unit causes the detected facial images with a degree of priority calculated for the plurality of detected facial images from a degree of similarity between the respective detected facial images of the plurality of detected facial images and the specific facial image determined by the first specific facial image determination unit and a degree of suitability indicating a degree suitable for printing, the degree of priority being a degree of priority up to a predetermined number, to be displayed as similar facial image candidates in a second facial image display area, a second specific facial image determination unit determines the facial image designated by a second facial image designation unit among the facial images displayed in the second facial image display area by the second display control unit, as the specific facial images, a first updating unit causes facial images excluding the facial image designated by the first facial image designation unit and the facial image displayed in the second facial image display area from the plurality of detected facial images to be a plurality of new detected facial images, and control unit causes the process of the second display a control unit and the process of the second specific facial image determination unit to be repeated.

This invention provides a recording medium having a program that controls a computer of the image display control device.

The image display control device may further include a third display control unit for causing the facial image designated by the second facial image designation unit to be displayed in a third facial image display area.

The degree of priority, for example, is calculated for the plurality of detected facial images from a degree of similarity to at least one or more specific facial images among the specific facial image determined by the first specific facial image determination unit and the specific facial image determined by the second specific facial image determination unit, and the degree of suitability.

The second display control unit, for example, causes the detected facial image to be displayed in the second facial image display area in a descending order of the degree of priority.

The image display control device may further include a first warning unit for warning according to a facial image already designated by a second user different from a first user designating the facial image using the first facial image designation unit or the second facial image designation unit being designated by the first user using the first facial image designation unit or the second facial image designation unit.

The image display control device may further include a first priority correction unit for lowering the degree of priority of the facial image already designated by a second user different from a first user designating the facial image using the first facial image designation unit or the second facial image designation unit.

The image display control device may further include a second updating unit for causing facial images remaining by excluding the facial image already designated by a second user different from a first user designating the facial image using the first facial image designation unit or the second facial image designation unit from the plurality of detected facial images, to be the plurality of new detected facial images.

The image display control device may further include a second warning unit for warning according to at least two facial images specified by at least one of the first facial image designation unit or the second facial image designation unit being detected from the same original image.

The image display control device may further include a second degree of priority correction unit for lowering the degree of priority of the facial image remaining by excluding the facial image determined as the specific facial image among the facial images included in the original image from which the facial image determined as the specific facial image is detected.

The image display control device may further comprise a deletion unit for deleting the facial image remaining by excluding the facial image determined as the specific facial image among the facial images included in the original image from which the facial image determined as the specific facial image is detected, from the plurality of facial images.

The image display control device further comprises: a third priority correction unit for lowering the degree of priority of a plurality of facial images included in the same image when the degree of suitability is lower.

The second display control unit may cause the detected facial images with a degree of priority calculated for the plurality of detected facial images from a degree of similarity to a specific facial image determined in a previous process of the image display control device and the degree of suitability, the degree of priority being a degree of priority up to a predetermined number, to be displayed as the similar facial image candidates in the second facial image display area.

The image display control device may further include a original image input unit for inputting a plurality of original images; a facial image detection unit for detecting facial images from a plurality of original images input using the original image input unit and obtaining the plurality of detected facial images; and a degree of suitability calculation unit for calculating the degree of suitability for the respective facial images of the plurality of detected facial images detected by the facial image detection unit.

The first display control unit is preferred to cause at least one or more facial images among the plurality of detected facial images detected from a set image in which a plurality of faces are reflected, to be displayed in the first facial image display area.

The image display control device may further include an expected number calculation unit for calculating an expected number of facial images that are designated by the second facial image designation unit among the facial images included in the plurality of detected facial image that are caused to be the plurality of new detected facial images by the first updating unit; and a fourth display control unit for causing the expected number of facial images calculated by the expected number calculation unit to be displayed.

The image display control device may further include a third warning unit for warning according to the expected number of facial images calculated by the expected number calculation unit being equal to or smaller than a predetermined number.

The image display control device may further include a fifth display control unit for causing an original image including the facial images displayed in the third facial image display area or a thumbnail image of the original image to be displayed with an assigned mark.

The image display control device may further include a sixth display control unit for assigning a mark to the specific facial image and displaying the mark around the original image from which the specific facial image is detected.

The image display control device may further comprising an input unit for inputting a grade or a class. In this case, the first display control unit causes the plurality of detected facial images obtained from persons belonging to the grade or the class input by the input unit to be displayed in the first facial image display area.

The image display control device may further include a grouping unit for grouping two or more detected facial images having a degree of similarity equal to or greater than a threshold value among the plurality of detected facial images. In this case, the second display control unit causes the two or more detected facial images grouped by the grouping unit to be displayed in the second facial image display area for each group.

The image display control device may further include an age input unit for inputting an age. In this case, the grouping unit increases the threshold value when the age input from the age input unit is lower.

The image display control device may further include a feature storage unit for storing a feature of a print-ordered facial image among the specific facial images, for each user, and a fourth priority correction unit for increasing the degree of priority of the facial image with the feature corresponding to a user operating the image display control device among the features stored in the feature storage unit.

The fifth display control unit may assign a mark to a portion of the facial image displayed in the third facial image display area, and cause an original image including the facial image displayed in the third facial image display area or a thumbnail original image to be displayed.

The image display control device may further include a seventh display control unit for causing a non-confirmed original image that is an original image including respective facial images among the plurality of new detected facial images obtained by the first updating unit or a non-confirmed thumbnail original image that is a thumbnail original image of the original image to be displayed with an assigned mark indicating non-confirmation, or causing the facial image included in the plurality of new detected facial images among the non-confirmed original images or the non-confirmed thumbnail original images to be displayed with an assigned mark indicating non-confirmation.

The image display control device may further include an eighth display control unit for causing the facial image included in the plurality of new detected facial images obtained by the first updating unit to be displayed with a mark assigned around the original image from which the facial image is detected.

The first facial image display area, the second facial image display area, and the third facial image display area, for example, are formed in the display screen of the user terminal that can communicate with the image display control device. In this case, the first display control unit transmits web page data in which at least one or more facial images are displayed in the first facial image display area, to the user terminal, the second display control unit transmits web page data in which the detected facial images having a priority up to a predetermined number are displayed as similar facial image candidates in the second facial image display area, to the user terminal, and the third display control unit transmits the web page data in which the facial image designated by the second facial image designation unit is displayed in the third facial image display area, to the user terminal.

Further, the fourth display control unit, for example, transmits web page data in which the expected number of facial images calculated by the expected number calculation unit is displayed on a display screen of the user terminal, to the user terminal, and the fifth display control unit, for example, transmits web page data in which the original image including the facial image displayed in the third facial image display area or the thumbnail original image of the original image is assigned with a mark and displayed in the display screen of the user terminal, to the user terminal. Further, the sixth display control unit, for example, transmits web page data in which the mark is assigned to the specific facial image and displayed around the original image from which the specific facial image has been detected in the display screen of the user terminal, to the user terminal, and the seventh display control unit, for example, transmits web page data in which a non-confirmed original image that is an original image including respective facial images among the plurality of new detected facial images obtained by the first updating unit or a non-confirmed thumbnail original image that is a thumbnail original image of the original image is assigned with a mark indicating non-confirmation and displayed in the display screen of the user terminal, to the user terminal, or web page data in which the facial image included in the plurality of new detected facial images among the non-confirmed original images or the non-confirmed thumbnail original images is assigned with a mark indicating non-confirmation and displayed in the display screen of the user terminal, to the user terminal.

According to the invention, at least one or more facial images among the plurality of detected facial images is displayed in the first facial image display area. A facial image of a person that a user desires to look for from among the facial images displayed in the first facial image display area is designated. The designated facial image is determined as the specific facial image that is used to look for a facial image similar to the designated facial image. The detected facial image having a degree of priority up to predetermined number calculated from the degree of similarity to the determined specific facial image and the degree of suitability indicating a degree suitable for printing is displayed as the similar facial image candidate in the second facial image display area. The facial image is designated from among the facial images displayed in the second facial image display area, and the designated facial image is determined as the specific facial image. This determined specific facial image is a facial image of a person that the user desires to look for. Since the facial image is looked for in consideration of the degree of suitability and displayed in the second facial image display area, instead of looking for a facial image merely similar to the facial image the user wants to look for and displaying the facial image in the second facial image display area, such the image display control device, the image display control method, and the recording medium having the image display control program stored thereon enables to look for the facial image suitable for printing relatively easily.

BRIEF DESCRIPTION OF THE DRAWINGS

FIG. 6 illustrates a relevant information table.

FIG. 7 illustrates a degree-of-suitability table.

FIG. 8 illustrates a degree of face similarity table.

FIG. 18 illustrates a specific face table.

FIG. 19 illustrates a detected facial image table.

DESCRIPTION OF THE PREFERRED EMBODIMENTS

Figure 1:
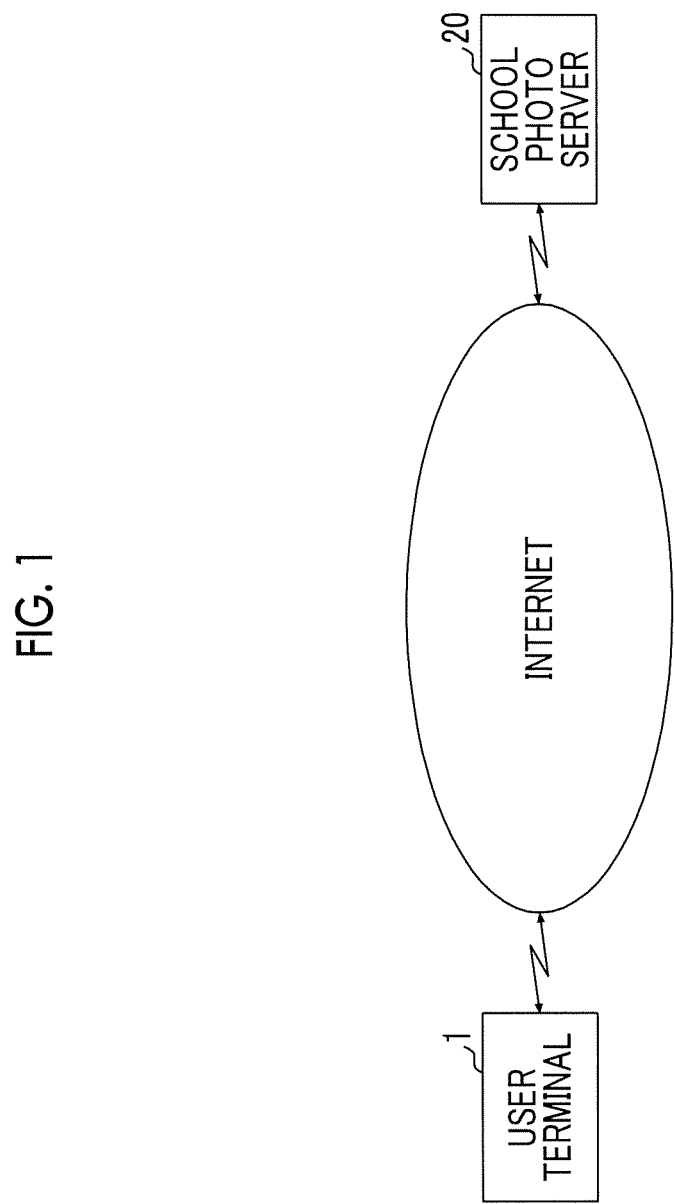
FIG. 1 is an overview of a school photo system.

FIG. 1 illustrates an embodiment of the present invention, and illustrates an overview of a school photo system.

A school photo system is a system in which a user (for example, a guardian) looks for a desired image (for example, an image of his or her child) from among a large number of images obtained by a photographer or the like imaging a student or the like in an event such as a school event.

The school photo system includes a user terminal 1 and a school photo server 20 that are communicatable to each other over a network such as the Internet. The user terminal 1 is a smart phone (a multifunctional portable phone), a portable phone, a personal computer located in a user's home, or the like, and may be a device that is communicatable with the school photo server 20.

Figure 2:
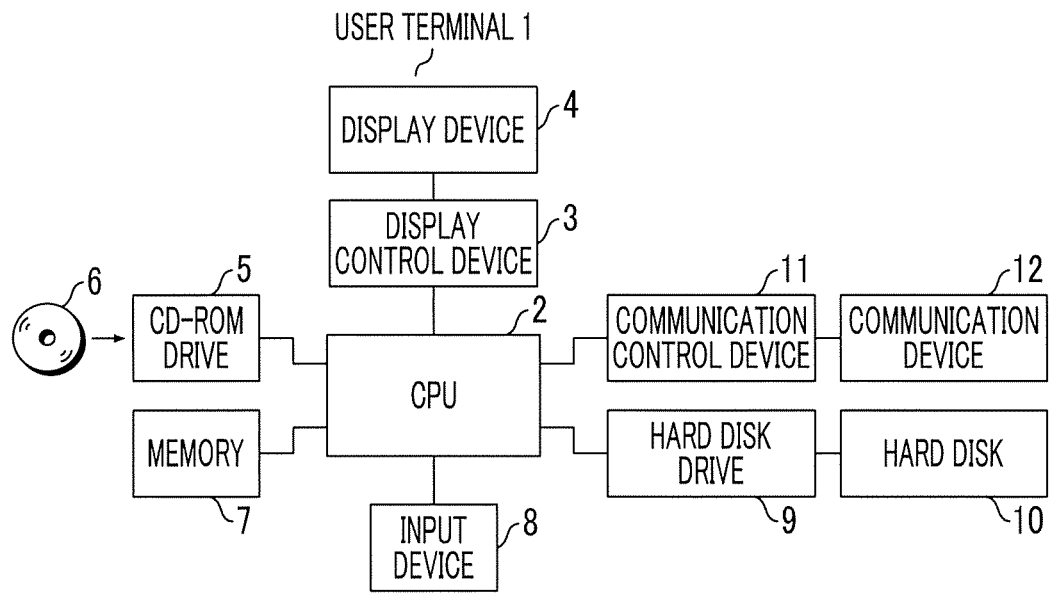
FIG. 2 is a block diagram illustrating an electrical configuration of a user terminal device.

FIG. 2 is a block diagram illustrating an electrical configuration of the user terminal 1. The user terminal 1 illustrated in FIG. 2 is a personal computer, and an electrical configuration of the personal computer is illustrated.

An entire operation of the user terminal 1 is controlled by a central processing unit (CPU) 2.

As will described below, the user terminal 1 includes, for example, a display device 4 in which a facial image or the like is displayed on a display screen, a display control device 3 that controls a display of the display device 4, a compact disk read only memory (CD-ROM) drive 5 that reads an operation program from a compact disk read only memory (CD-ROM) 6 in which an operation program of the user terminal 1 is stored, a memory 7 that stores predetermined data or the like, and an input device 8 (a keyboard or a mouse) that inputs a command to the user terminal 1. Further, the user terminal 1 includes a hard disk drive 9, a hard disk 10, a communication device 12 for communicating with the school photo server 20 over the Internet, and a communication control device 11 for controlling the communication device 12. The operation program of the user terminal 1 may be not only read from a recording medium such as the CD-ROM 6, but also downloaded over the Internet, and may be installed in the user terminal 1.

Figure 3:
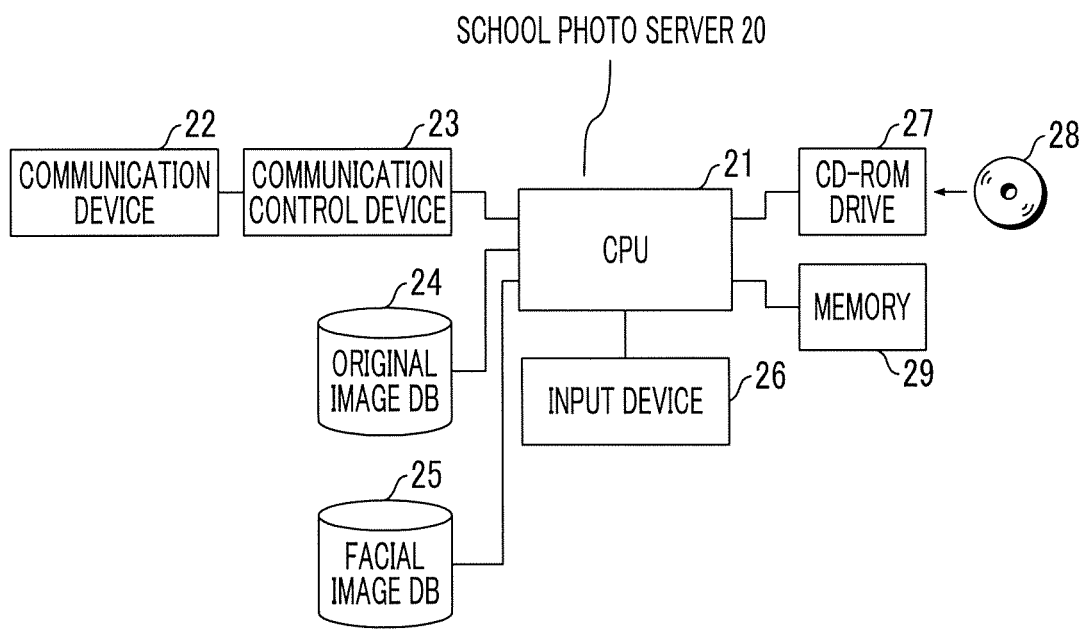
FIG. 3 is a block diagram illustrating an electrical configuration of a school photo server.

FIG. 3 is a block diagram illustrating an electrical configuration of the school photo server 20.

An entire operation of the school photo server 20 is controlled by a central processing unit (CPU) 21.

The school photo server 20 includes a communication device 22 for communicating with the user terminal 1 or the like over the Internet, a communication control device 23 that controls the communication device 22, an original image database 24, a facial image database 25, and an input device 26 that provides a command to the photo server 20. Further, the school photo server 20 includes a compact disk read only memory (CD-ROM) drive 27 that reads an operation program from a compact disk read only memory (CD-ROM) 28 in which the operation program to be described below is stored, and a memory 29 that stores data or the like. The operation program of the school photo server 20 is not only read from the CD-ROM 28, but may also be downloaded to the school photo server 20 over the Internet.

Figure 4:
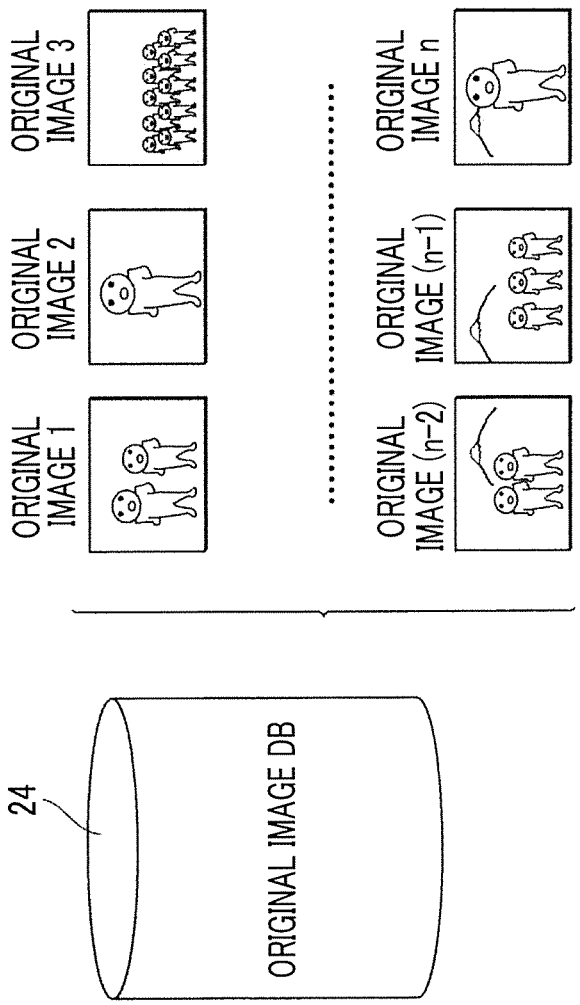
FIG. 4 illustrates an original image stored in an original image database.

FIG. 4 illustrates a large number of original images stored in the original image database 24.

Original images 1 to n stored in the original image database 24 are images captured by a photographer at an event or the like. The original images 1 to n may be uploaded to the school photo server 20 over the Internet and stored in the original image database 24 of the school photo server 20, and in a case where the original images 1 to n are stored in a memory card (not illustrated), the original images 1 to n may be read from the memory card. In a case where the original images 1 to n are read from the memory card, it goes without saying that the school photo server 20 in which a memory card reader is provided is used.

Figure 5:
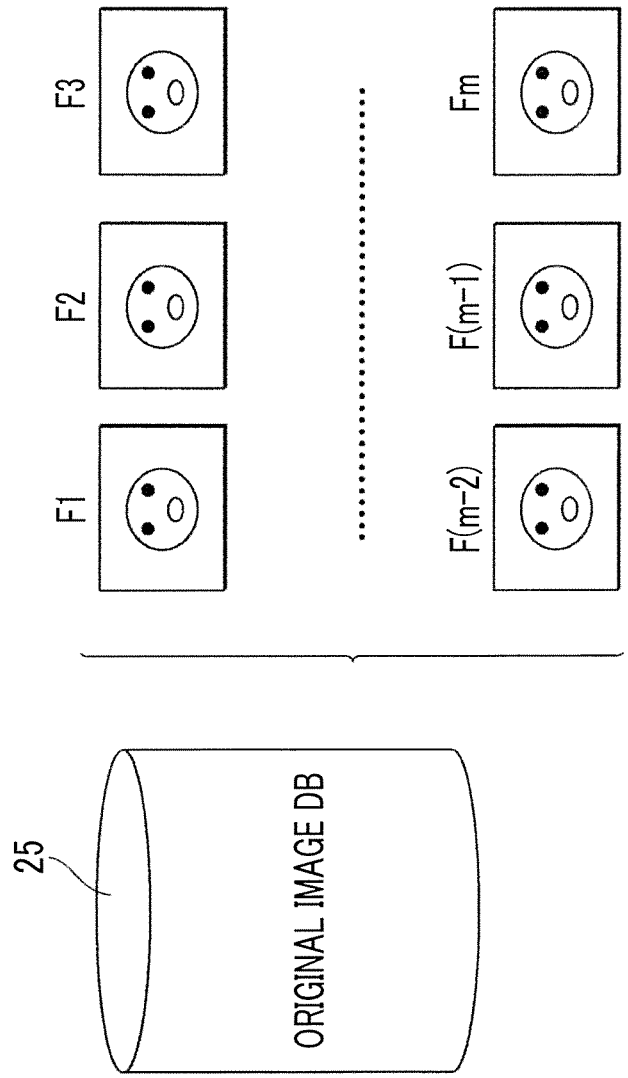
FIG. 5 illustrates facial images stored in the facial image database.

FIG. 5 illustrates a large number of facial images stored in the facial image database 25.

Facial images F1 to Fm are facial images (a plurality of detected facial images) detected from the original images 1 to n stored in the original image database 24. The original images 1 to n stored in the original image database 24 are read by a CPU 21 of the school photo server 20. A process of facial image detection from the read original images 1 to n is performed by the CPU 21, and the facial images F1 to Fm are obtained. The obtained facial images F1 to Fm are stored in the facial image database 25 by the CPU 21. The facial image detection may be performed by another computer instead of being performed by the school photo server 20. Image data indicating a facial image detected in the other computer is transmitted from the other computer to the school photo server 20, and the facial images F1 to Fm are stored in the facial image database 25.

FIG. 6 is an example of relevant information table.

The relevant information table stores information on the facial images F1 to Fm stored in the facial image database 25. The relevant information table is stored in the memory 29 of the school photo server 20.

In the relevant information table, the original image of the facial image, coordinates of the face in the original image, and information indicating whether the facial image is obtained from a set image (the set image is an original image in which a plurality of facial images and a plurality of person images are included) are stored for each facial image. In a case where the facial image is obtained from the set image, a sign Y is stored, and in a case where the facial image is not obtained from the set image, a sign N is stored.

FIG. 7 is an example of a degree-of-suitability table.

The degree-of-suitability table stores a degree of suitability indicating a degree suitable for printing, for each facial image, in a case where a facial image (original image) is printed. A focus point indicating a degree of blurring of the facial image, a size point indicating a proportion of a size of the facial image to the original image, and a degree-of-suitability point are stored for each of the facial images detected from the original image in the degree-of-suitability table. In the example in FIG. 7, the degree-of-suitability point is a sum of the focus point and the size point, but may not necessarily be a sum. The focus point is higher when a facial image is less blurred, and the size point is higher when a proportion of a size of the facial image to an original image is greater. When the degree-of-suitability point is higher, the image is suitable for printing. The degree-of-suitability point of the face may be calculated from one or more of a plurality of indices indicating the degree of suitability of the face, such as a size of a face in an original image, a position in the original image, a degree of focus on the face, a degree of smiling, opening or closing of eyes, an orientation of the face, and a score of face likeliness.

The focus point, the size point, and the degree-of-suitability point are calculated by the CPU 21 of the school photo server 20. However, the points may be calculated by another computer other than the school photo server 20. The degree-of-suitability table is stored in the memory 29 of the school photo server 20.

FIG. 8 illustrates an example of a degree of face similarity table.

The degree of face similarity table stores a degree of similarity among facial images F1 to Fm stored in the facial image database 25. The degree of face similarity is between 0 and 1.0, and is higher when the facial images are more similar to each other. If facial images are the same, the degree of facial image similarity is 1.0.

For example, a degree of face similarity between the facial image F1 and the facial image F2 is 0.2, and it can be seen that the facial images are not similar to each other. That is, it can be seen that a person of the facial image F1 and a person of the facial image F2 are not the same person. On the other hand, a degree of face similarity between the facial image F1 and the facial image F5 is 0.88, and it can be seen that a person of the facial image F1 and a person of the facial image F5 are highly likely to be the same person. Although the degree of similarity stored in the degree of face similarity table is also calculated by the CPU 21 of the school photo server 20, the degree of similarity may be calculated by a computer other than the school photo server 20. The degree of face similarity table is stored in the memory 29 of the school photo server 20.

Figure 9:
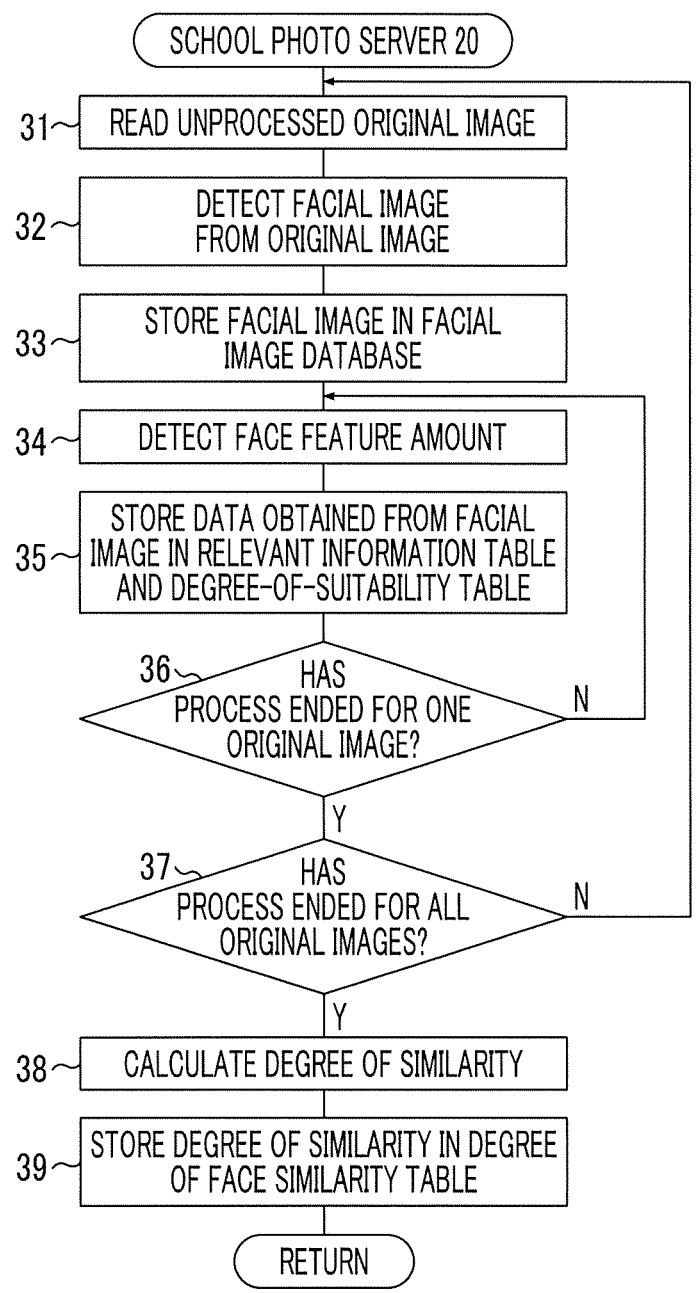
FIG. 9 is a flowchart illustrating a processing procedure of a school photo server.

FIG. 9 is a flowchart illustrating a processing procedure of the school photo server 20.

The flowchart illustrated in FIG. 9 illustrates a processing procedure for calculating the above-described degree of face similarity, and the like.

An unprocessed original image on which the process illustrated in FIG. 9 is not performed among the original images stored in the original image database 24 is read by the CPU 21 (step 31). The facial image detection process is performed on the read unprocessed original image by the CPU 21 (step 32). The detected facial image is stored in the facial image database 25 by the CPU 21 (step 33). Further, the face feature amount is detected from the detected facial image by the CPU 21 (step 34). The facial feature amount indicates shapes of eyes, a nose, and the like constituting the face, a relative positional relationship thereof, color or a shade distribution of a face surface, or the like, and is used to calculate a degree of similarity between the faces. The detected facial feature amount is stored in the memory 29 for each facial image (step 35). Further, identification data (file name) of the original image from which the facial image has been detected, coordinates of the face in the original image, and information indicating whether the original image from which the facial image has been detected is the set image are detected corresponding to the detected facial image, and such information is stored in the relevant information table illustrated in FIG. 6. Further, a focus point or a size point is calculated for the detected facial image by the CPU 21, and a degree-of-suitability point is obtained. The focus point, the size point, and the degree-of-suitability point are stored in the degree-of-suitability table illustrated in FIG. 7 for each facial image.

The processes of steps 34 and 35 are repeated for all facial images included in one unprocessed original image (step 36). If the processes of steps 34 and 35 are completed for all the facial images included in one unprocessed original image (YES in step 36), it is confirmed whether the processes of steps 31 to 36 have ended for all of the original images 1 to n stored in the original image database 24 (step 37). If the processes of steps 31 to 36 end for all of the original images 1 to n (YES in step 37), the degree of similarity between the facial images is calculated using the facial feature amount stored in the memory 29 by the CPU 21 (step 38). The calculated degree of similarity is stored in the degree of face similarity table illustrated in FIG. 8 by the CPU 21 (step 39).

By performing the above-described process, the relevant information table, the degree-of-suitability table, the degree of face similarity table, and the like are generated and stored in the memory 29.

Figure 10:
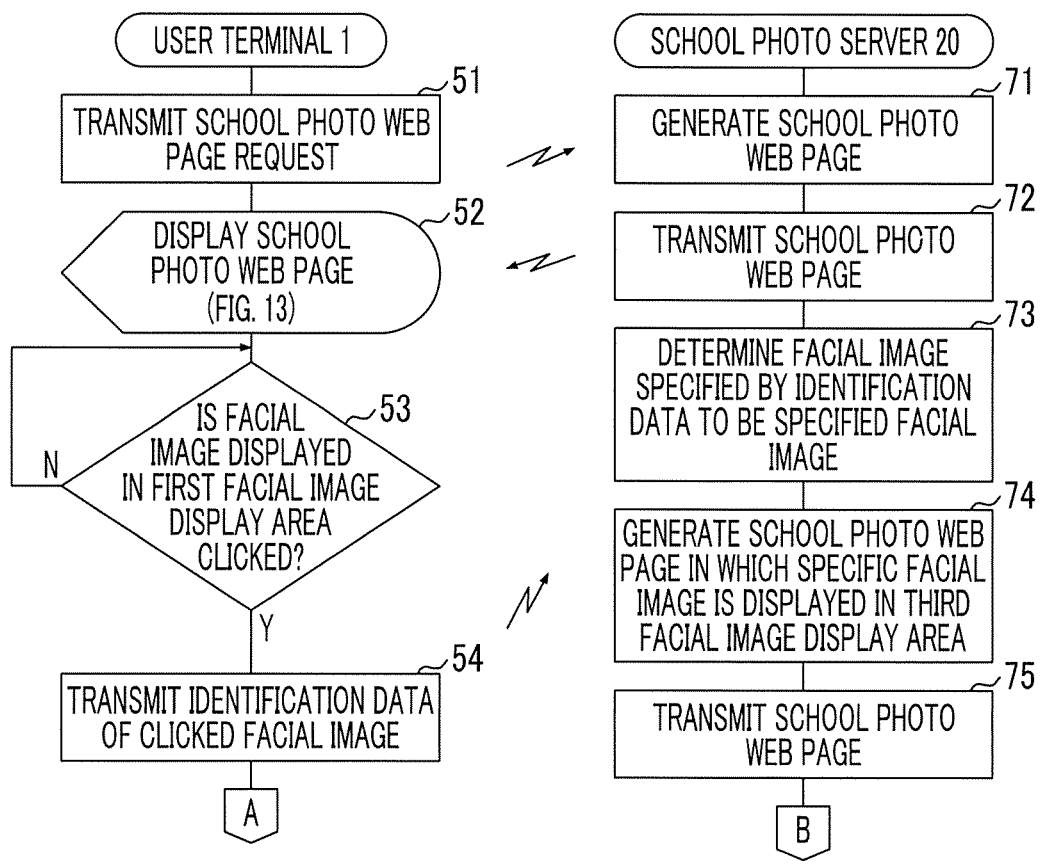
FIG. 10 is a flowchart illustrating a processing procedure of a school photo server.
Figure 11:
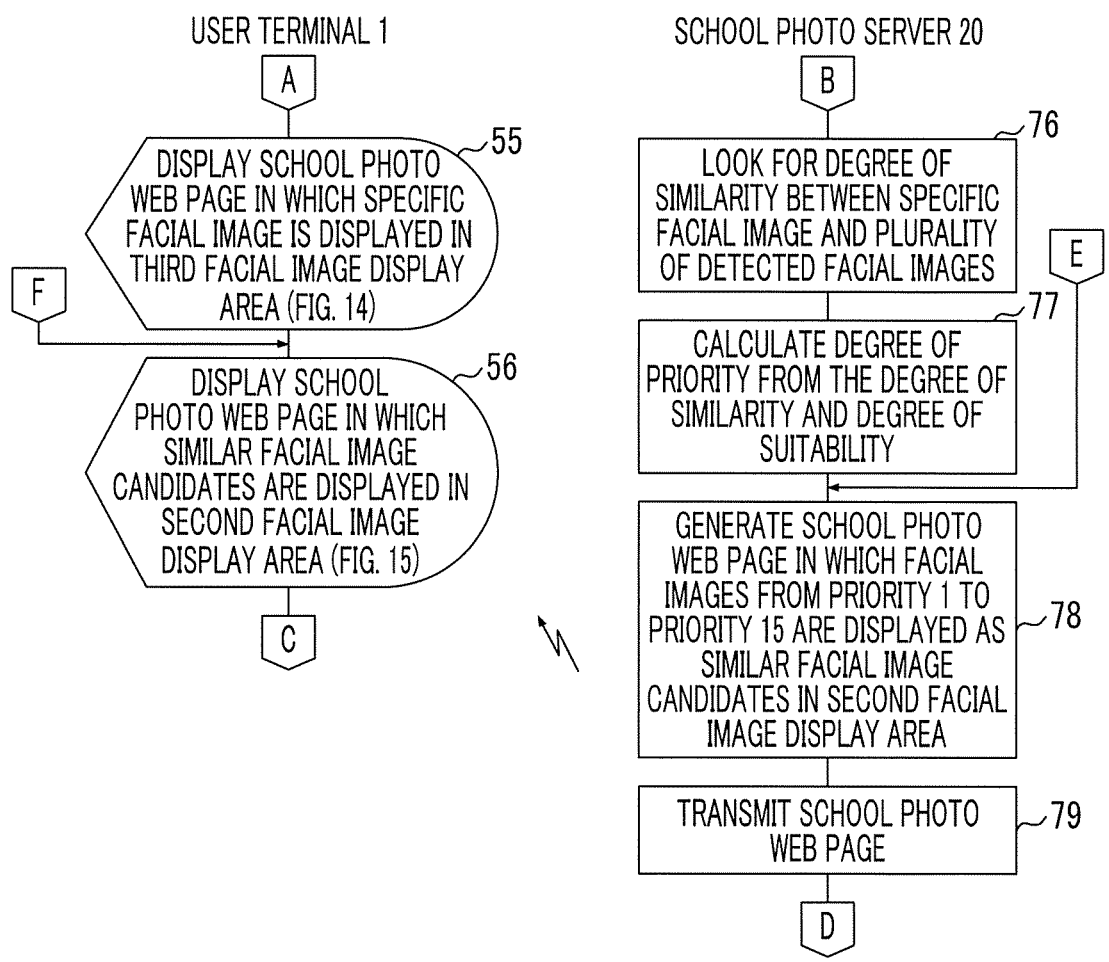
FIG. 11 is a flowchart illustrating a processing procedure of a school photo server.
Figure 12:
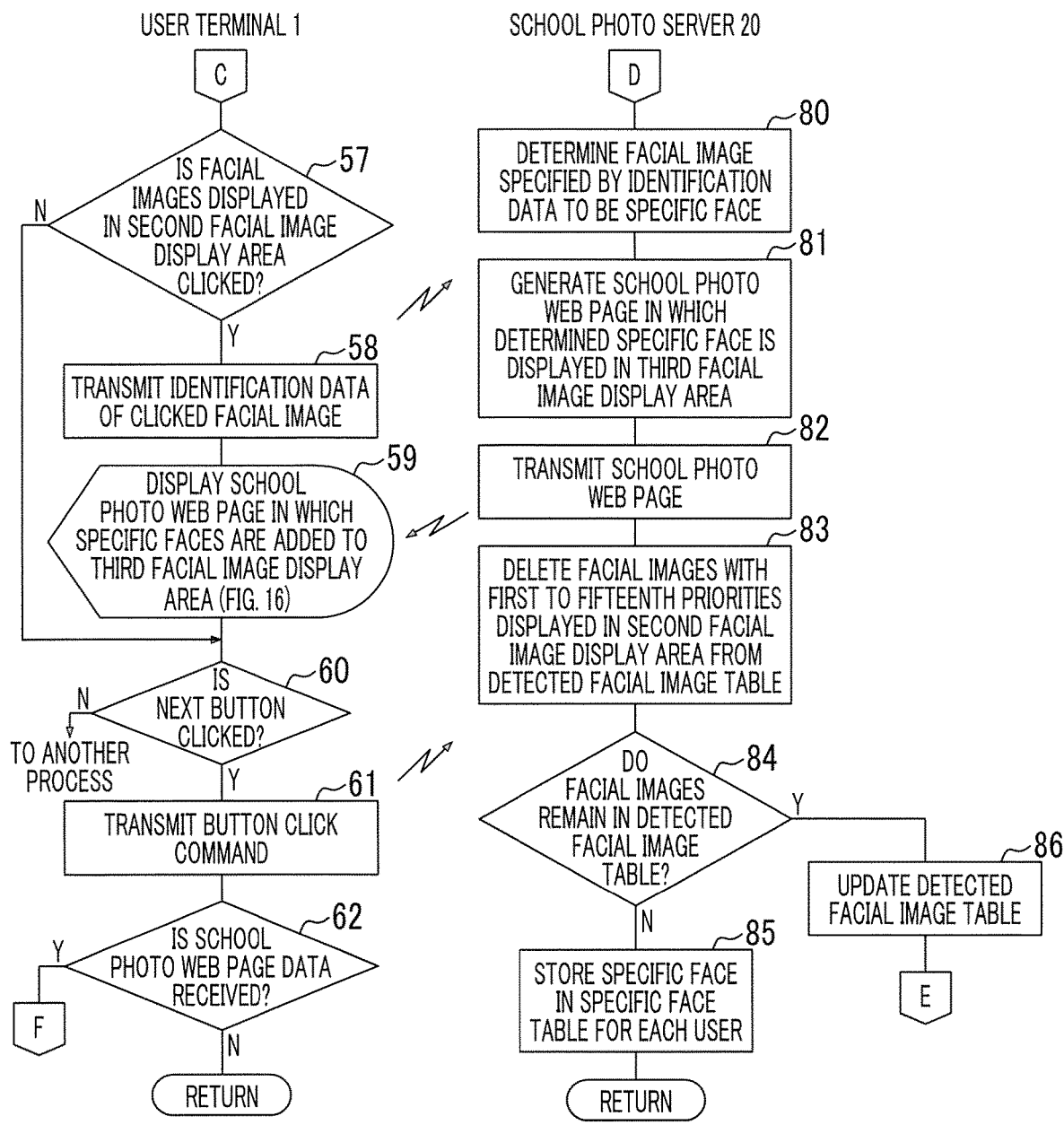
FIG. 12 is a flowchart illustrating a processing procedure of a school photo server.

FIGS. 10 to 12 are flowchart illustrating a processing procedure of the school photo system. In FIGS. 10 to 12, a left flowchart illustrates a processing procedure in the user terminal 1, and a right flowchart illustrates a processing procedure in the school photo server 20.

In this processing procedure, a facial image of a person that the user desires to look for among a large number of facial images stored in the facial image database 25, which is a facial image suitable for printing, is relatively simply looked for.

A user who operates the user terminal 1 inputs a user ID to the user terminal 1. A school photo web page request and the user ID are transmitted from the user terminal 1 to the school photo server 20 (step 51).

Figure 13:
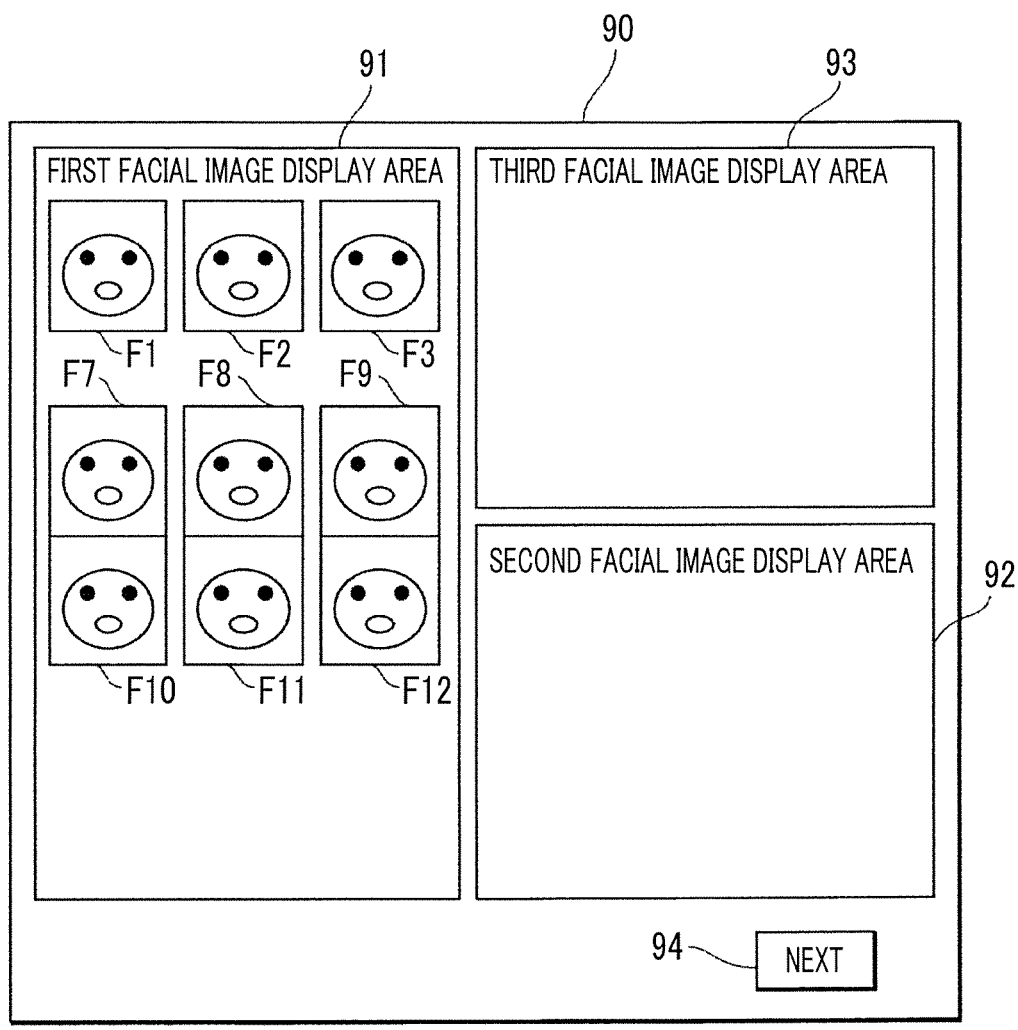
FIG. 13 illustrates an example of a window displayed on a user terminal.

If the school photo web page request and the user ID transmitted from the user terminal 1 are received by the school photo server 20, a school photo web page including a school photo window 90 as illustrated in FIG. 13 is generated by the CPU 21 (step 71). The generated school photo web page is transmitted from the school photo server 20 to the user terminal 1 (step 72).

If the school photo web page transmitted from the school photo server 20 is received in the user terminal 1, the school photo web page including the school photo window 90 illustrated in FIG. 13 is displayed in the display screen of the display device 4 of the user terminal 1 (step 52).

Referring to FIG. 13, a first facial image display area 91, a second facial image display area 92, and a third facial image display area 93 are included in the window 90. In the first facial image display area 91, a large number of facial images stored in the facial image database 25 are displayed. At least one or more facial images among the plurality of detected facial images detected from among the plurality of original images is displayed in the first facial image display area by the CPU 21, the communication device 22, and the communication control device 23 (an example of the first display control unit) of the school photo server 20. Further, a Next button 94 that is clicked by the user in a case where a command for performing a next process is provided is also included in the window 90.

The user of the user terminal 1 clicks a facial image of a person desired to be looked for from among the facial images displayed in the first facial image display area 91 (for example, a facial image of a child of the user or a facial image of a child of an acquaintance if the facial image stored in the facial image database 25 is a facial image of a student in a school and the user is a guardian of the student) using a mouse (an example of the first facial image designation unit) (step 53) (designation of the facial image). When the facial image is clicked by the user (YES in step 53), identification data of the clicked facial image is transmitted from the user terminal 1 to the school photo server 20 (step 54).

If the identification data transmitted from the user terminal 1 is received in the school photo server 20, a facial image specified by the received identification data is determined as a specified facial image that is used to look for a facial image similar to the facial image designated by the user of the user terminal 1 by the CPU 21 (step 73) (an example of the first specific facial image determination unit).

FIG. 18 is an example of a specific face table.

The specific face table stores a specific facial image determined on the basis of the designation of the user, for each user, and is stored in the memory 29. For example, if the user of the user terminal 1 is a first user 1, the facial image F1 is designated by the first user 1, and the facial image F1 is determined as the specific facial image, data for specifying the specific facial image F1 is stored corresponding to the first user 1 in the specific face table.

Referring back to FIG. 10, a school photo web page in which the determined specific facial image is displayed in the third facial image display area is generated by the CPU 21 (step 74). The generated school photo web page is transmitted from the school photo server 20 to the user terminal 1 (step 75).

Figure 14:
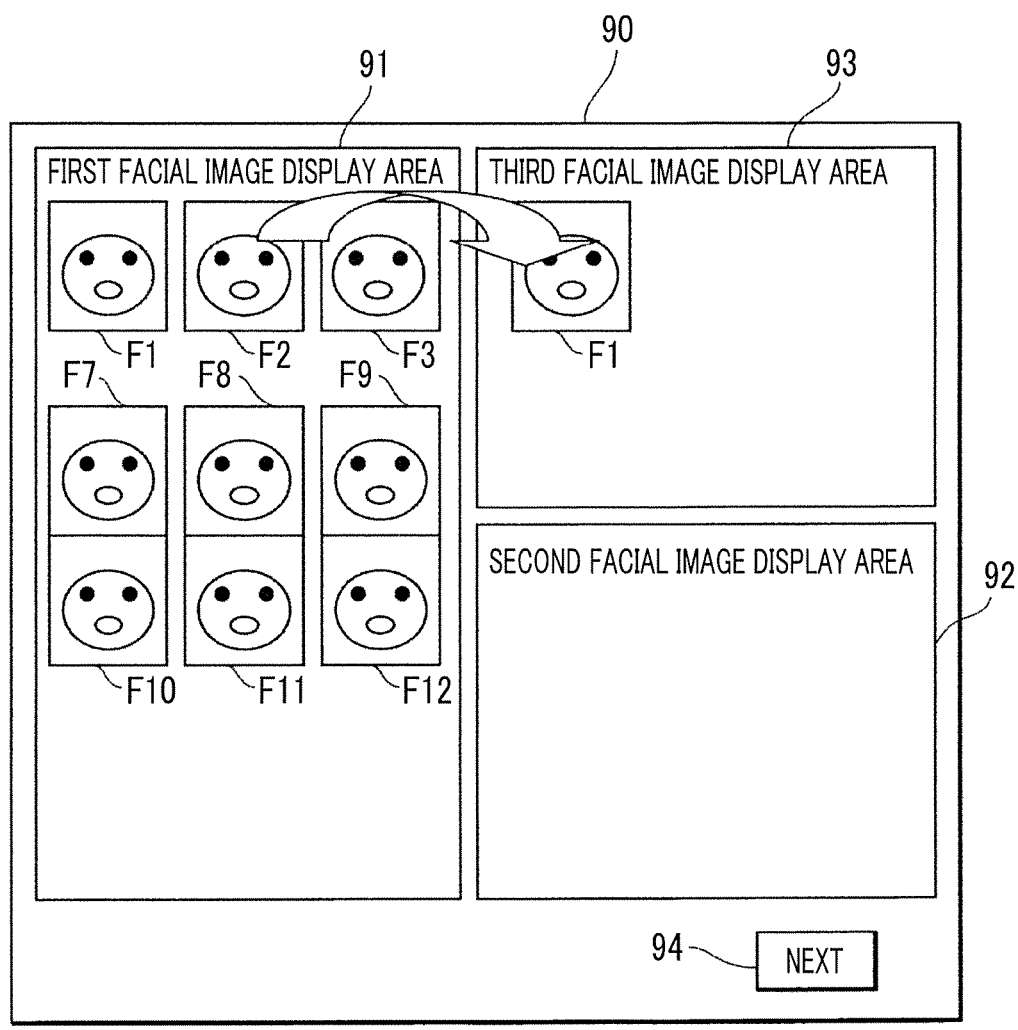
FIG. 14 illustrates an example of a window displayed on a user terminal.

If the school photo web page transmitted from the school photo server 20 is received in the user terminal 1, the window 90 in which the facial image F1 clicked by the user is displayed in the third facial image display area 93 illustrated in FIG. 14 is displayed in the display screen of the display device 4 of the user terminal 1 (step 55).

Further, in the school photo server 20, a degree of similarity between the specific facial image determined as described above, and the plurality of detected facial images (a plurality of initial detected facial images are facial images stored in the facial image database 25, and the plurality of detected facial image are updated as described below) is looked for from the degree of similarity table illustrated in FIG. 8 (step 76). A degree of priority at which a facial image is displayed as a facial image similar to the determined specific facial image is calculated from the found degree of similarity, and the degree of suitability point (an example of the degree of suitability) stored in the degree-of-suitability table by the CPU 21 (step 77). The calculated degree of priority is stored in the detected facial image table.

FIG. 19 is an example of the detected facial image table.

The detected facial image table is generated for each user, and is stored in the memory 29.

The detected facial image table illustrated in FIG. 19 is a detected facial image table in a case where the specific facial image is the facial image F1. The detected facial image table includes items of a degree of facial image similarity to the facial image F1, a degree-of-suitability point, a degree-of-priority point (an example of a degree of priority), a priority, and a similar facial image candidate. The degree-of-priority point is obtained by a product of the degree of face similarity and the degree of suitability point. The priority is determined in a descending order of degree-of-priority points. The priority indicates an order of a display in the second facial image display area 92 as a facial image that is similar to the determined specific facial image (in this case, the facial image F1) and is suitable for printing. The similar facial image candidate is information on the facial image that becomes a candidate displayed as the similar facial image candidate in the second facial image display area 92. The facial images (for example, facial images F3 and F4) of which the similar facial image candidate item indicates "Yes" are facial images displayed in the second facial image display area 92, and the facial images (for example, facial images F2 and F5) of which the similar facial image candidate item indicates "No" are facial images not displayed in the second facial image display area 92 at present.

A school photo web page in which fifteen facial images from priority 1 to priority 15 of the detected facial image table (detected facial images with the degree of priority up to a predetermined number) are displayed as the similar facial image candidates in the second facial image display area 92 is generated by the CPU 21 (step 78). Fifteen (a predetermined number) facial images are displayed in the second facial image display area 92, but the number of facial images may not necessarily be 15. Less than fifteen or more than fifteen facial images may be displayed in the second facial image display area 92. The generated school photo web page is transmitted from the school photo server 20 to the user terminal 1 (step 79).

If the school photo web page transmitted from the school photo server 20 is received in the user terminal 1, the window 90 in which a similar facial image candidates are displayed in the second facial image display area 92 is displayed in the display screen of the display device 4 of the user terminal 1 (step 56).

Figure 15:
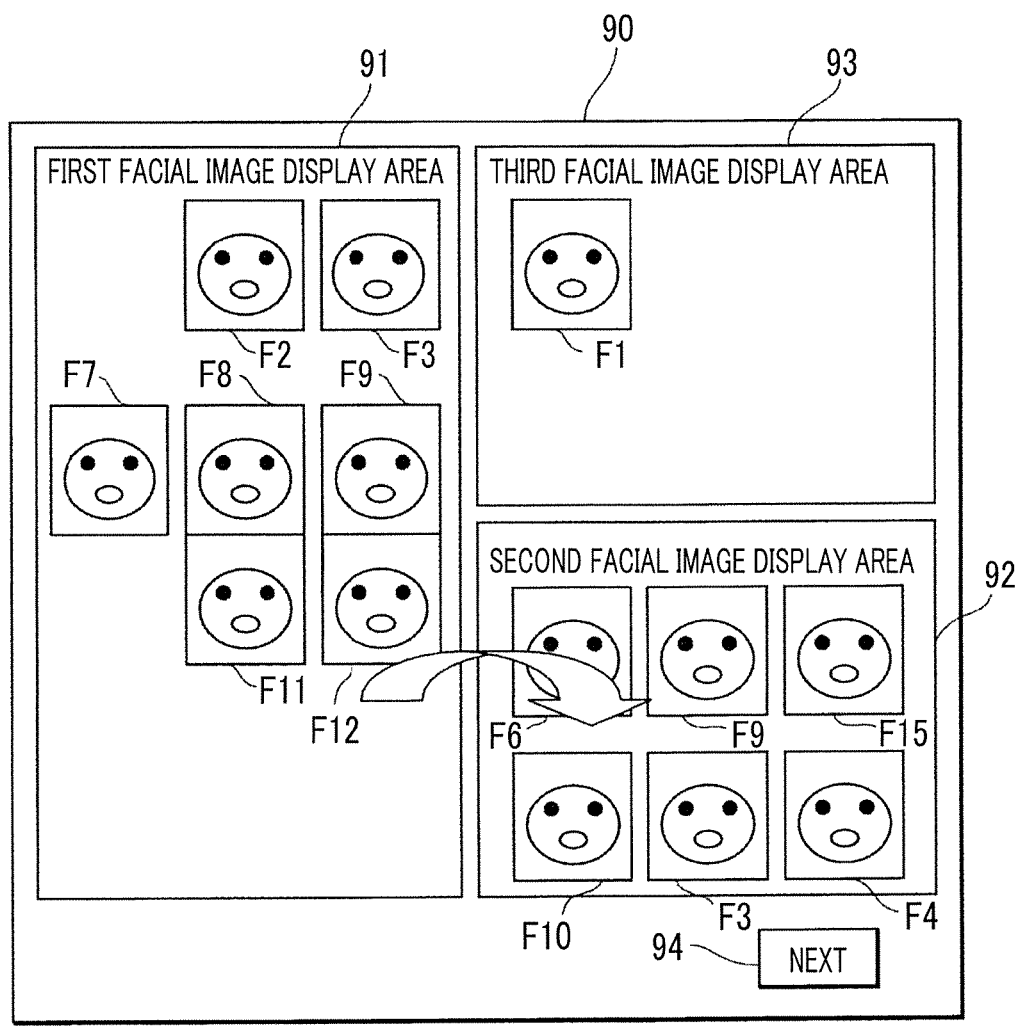
FIG. 15 illustrates an example of a window displayed on a user terminal.

FIG. 15 is an example of the window 90 in which a similar facial image candidates are displayed in the second facial image display area 92.

The facial images F6, F9, and the like determined as the similar facial image candidates as described above are displayed in the second facial image display area 92. Facial images other than the facial images determined as the similar facial image candidates and facial images other than the specific facial image are displayed in the first facial image display area 91. The facial image (specific facial image) designated by the user as described above is displayed in the third facial image display area 93.

Thus, the detected facial image with the degree of priority up to predetermined number can be displayed as the similar facial image candidates in a descending order of the degree of priority in the second facial image display area 92 by the CPU 21, the communication device 22, and the communication control device 23 (an example of the second display control unit) of the school photo server 20.

If any of the facial images (similar facial image candidates) displayed in the second facial image display area 92 is clicked using the mouse (an example of the second facial image designation unit) by the user of the user terminal 1 (YES in step 57), identification data of the clicked facial image is transmitted from the user terminal 1 to the school photo server 20 (step 58).

If the identification data transmitted from the user terminal 1 is received in the school photo server 20, the facial image specified by the identification data is determined as the specific facial image by the CPU 21 (step 80) (the second specific facial image determination unit). The identification data of the specific facial image is stored in the specific face table. A school photo web page in which the newly determined specific facial image is displayed in the third image display area is generated by the CPU 21 (step 81), and the generated school photo web page is transmitted from the school photo server 20 to the user terminal 1 (step 82).

Figure 16:
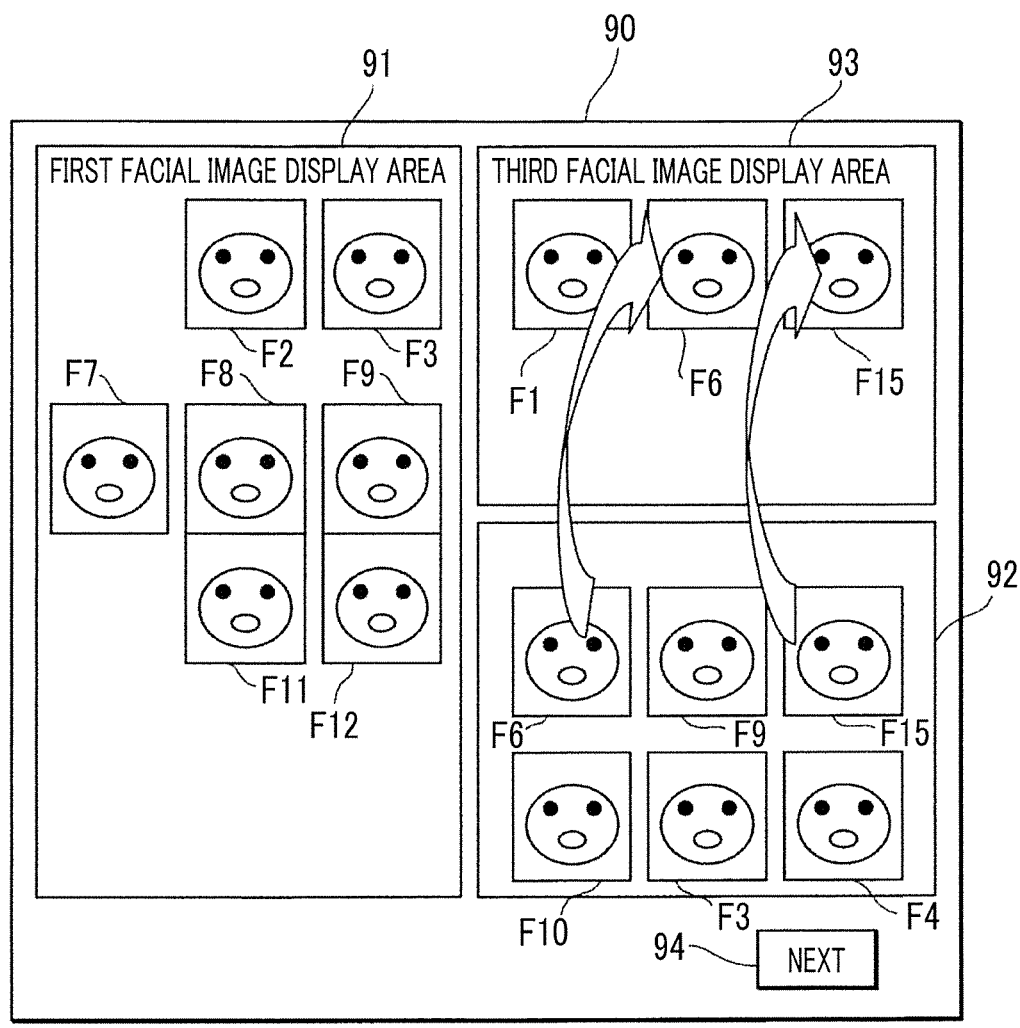
FIG. 16 illustrates an example of a window displayed on a user terminal.

If the school photo web page transmitted from the school photo server 20 is received in the user terminal 1, the window 90 in which facial images (in this case, the facial images F6 and F15) newly determined as specific facial images are displayed in the third facial image display area 93 illustrated in FIG. 16 is displayed in the display screen of the display device 4 of the user terminal 1 (step 59).

FIG. 16 is an example of the school photo window 90.

The facial images F1, F6, and F15 designated by the user are displayed as specific facial images in the third facial image display area 93.

Thus, the facial image designated using the mouse (the second facial image designation unit) from among the facial images in the second facial image display area 92 can be displayed in the third facial image display area 93 by the CPU 21, the communication device 22, and the communication control device 23 (the third display control unit) of the school photo server 20.

Referring to FIG. 12, if the Next button 94 is clicked by the user of the user terminal 1 (YES in step 60), a button click command is transmitted from the user terminal 1 to the school photo server 20 (step 61).

If the button click command transmitted from the user terminal 1 is received in the school photo server 20, data for the facial images with first to fifteenth priorities is deleted from the detected facial image table (see FIG. 19) by the CPU 21 (step 83). For the facial images remaining in the detected facial image table, the facial images remaining by excluding the facial image designated using the mouse (an example of the first facial image designation unit) by the user and the facial image displayed in the second facial image display area from the plurality of detected facial images are caused to be a plurality of new detected facial images (an example of a process of the first updating unit). Thus, the facial image remaining in the detected facial image table are caused to be a plurality of new detected facial images, the priority and the similar facial image candidates of the detected facial image table are updated (step 86), and the school photo web page in which the facial images with first to fifteenth priorities after updating are displayed in the second facial image display area 92 is generated by the CPU 21 (step 78). The generated school photo web page is transmitted from the school photo server 20 to the user terminal 1 (step 79).

Figure 17:
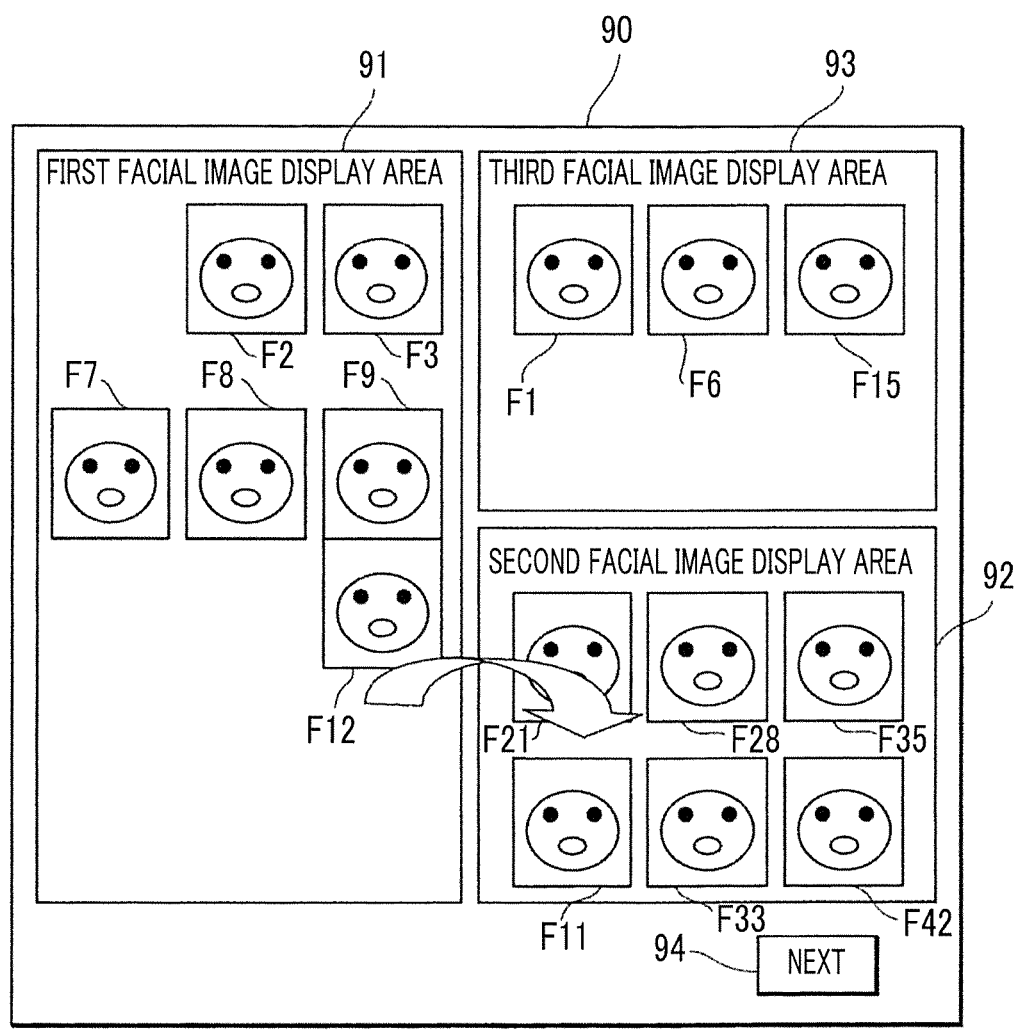
FIG. 17 illustrates an example of a window displayed on a user terminal.

If the school photo web page transmitted from the school photo server 20 is received in the user terminal 1 (YES in step 62), the facial images with the first to fifteenth priorities after updating are displayed in the second facial image display area 92 as illustrated in FIG. 17 in the display screen of the display device 4 of the user terminal 1 (step 56). Thus, the process of displaying the facial image as the similar facial image candidate in the second facial image display area (an example of a process in the second display control unit), the process of displaying the designated facial image in the third facial image display area (an example of a process in the third display control unit), and the process of determining a facial image as the specific facial image from among the facial images displayed in the second facial image display area (an example of a process in the second specific facial image determination unit) are repeated by the CPU 21 (an example of control unit).

The facial images similar to the facial image (specific facial image) F1 designated by the user, which are facial images suitable for printing, among the facial images displayed in the first facial image display area 91 are displayed in the second facial image display area 92 in an order of priority (a recommended order), the facial images displayed in the second facial image display area 92 are deleted from the plurality of detected facial images, the facial images similar to the facial image F1 designated again by the user from the plurality of updated detected facial images, which are the facial images suitable for printing, are repeatedly displayed in the second facial image display area 92 in an order of priority, making it possible to view the facial images suitable for printing, which are facial images of a person to be looked for, in a relatively short time.

Although the facial image similar to the facial image F1 determined as an initial specific face, which is the facial image suitable for printing, is looked for in the above-described embodiment, the facial image similar to the facial image F6 or F15 newly determined as the specific face as illustrated in FIG. 16, which is a facial image suitable for printing, as well as the facial image F1 determined as an initial specific face, may be displayed in the second facial image display area 92 as described above. In this case, the detected facial image table illustrated in FIG. 19 may be generated for each determined specific face (for example, for each of the facial images F1, F6, and F15), the degree of priority may be determined from the degree-of-priority points in all of the generated detected facial image tables, and the facial images with the first to fifteenth priorities may be to displayed as the similar facial image candidates in the second facial image display area. Accordingly, a degree of priority is calculated for the plurality of detected facial images from the degree of similarity to at least one or more specific facial images among the facial images displayed in the second facial image display area 92, and the degree of suitability. In this case, it goes without saying that it is preferable that the facial images displayed in the second facial image display area 92 is deleted from the detected facial image table and the updating process is performed as described above.

Although the determined specific facial image is displayed in the third facial image display area 93 in the above-described embodiment, the determined specific facial image may not be displayed. Further, the facial images displayed as the similar facial image candidates in the second facial image display area 92 may be displayed in an order of the degree of priority (a priority order) or may not necessarily be displayed in such a way.

Figure 20:
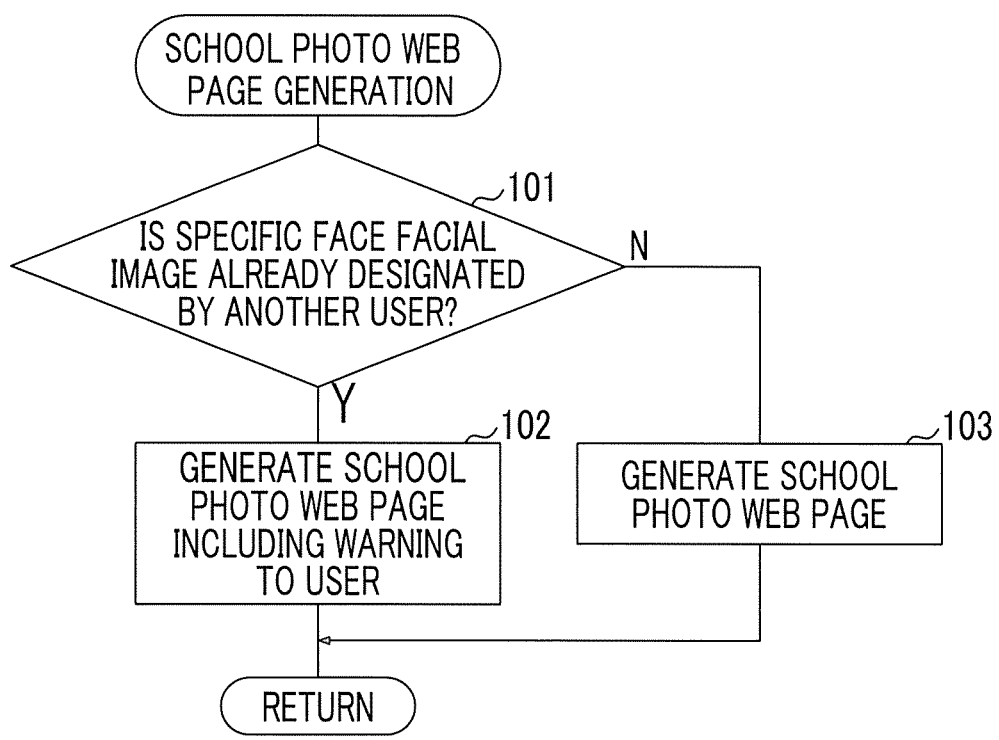
FIG. 20 is a flowchart illustrating a school photo web page generation processing procedure.

FIG. 20 is a flowchart illustrating a modification example of the school photo web page generation process procedure (for example, the processing procedures of step 74 in FIG. 10, step 78 in FIG. 11, and step 81 in FIG. 12).

In this processing procedure, the user is warned in a case where the specific facial image designated by the user has already been designated as the specific facial image by another user.

It is determined whether a specific face designated by the user is a facial image already designated by another user by referring to the specific face table illustrated in FIG. 18 (step 101).

In a case where the specific face designated by the user (first user) is a facial image already designated by another user (second user) (YES in step 101), a school photo web page including a warning to the user is generated by the CPU 21 (an example of the first warning unit) (step 102). In a case where the specific face designated by the user is not the facial image already designated by another user (NO in step 101), a school photo web page no including such a warning is generated by the CPU 21 (an example of the first warning unit) (step 103)

Figure 21:
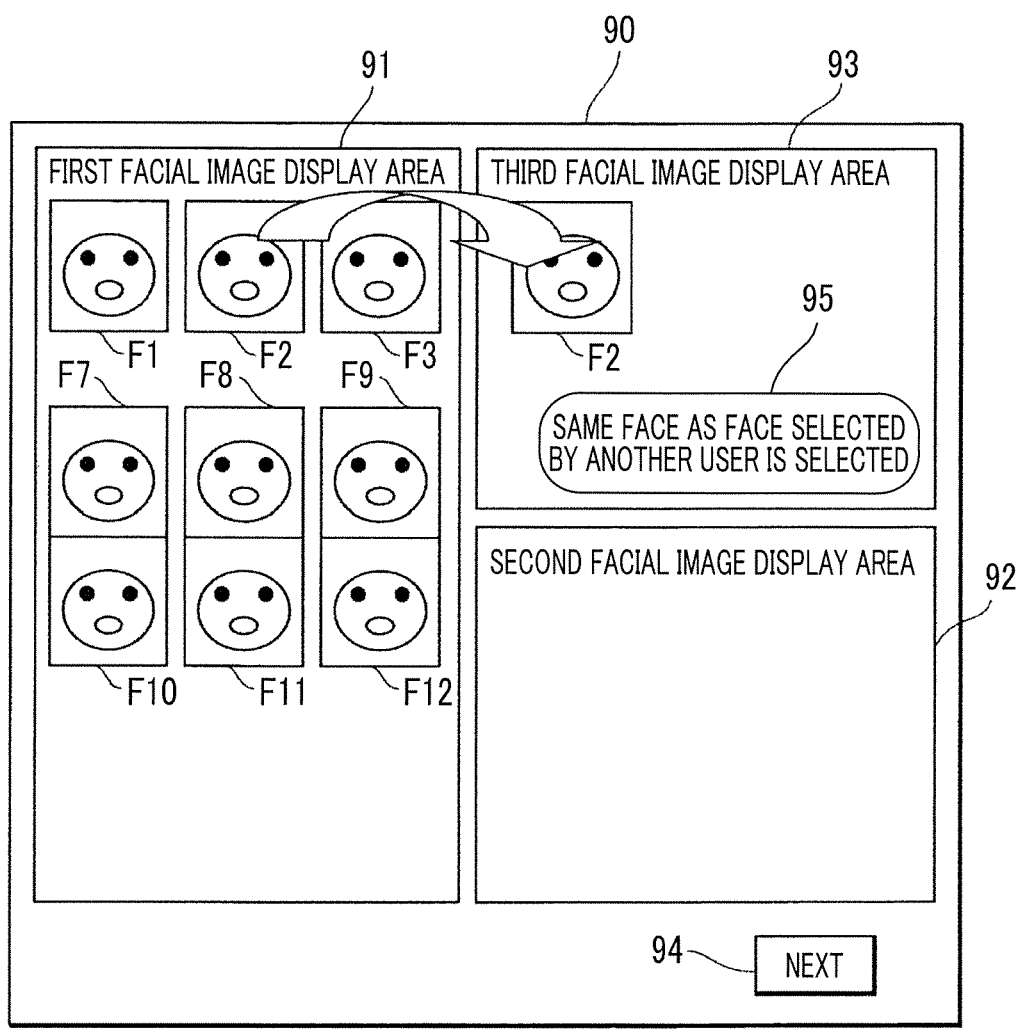
FIG. 21 is an example of a window displayed on the user terminal.

FIG. 21 illustrates an example of a window 90 that is included in the school web page including a warning to the user.

In a case where the specific face designated by the user is the facial image already designated by another user as described above, a warning statement 95 is displayed in the third facial image display area 93 (the third facial image display area may be necessarily not used, and the warning statement 95 may be displayed in another area).

By viewing this warning statement 95, the user can recognize that the facial image is likely to be designated by mistake. Thus, warning can be performed according to the facial image already designated by a second user different from the first user specifying the facial image using a mouse (an example of the first facial image designation unit and the second facial image designation unit) being designated by the first user using the mouse (an example of the first facial image designation unit and the second facial image designation unit).

Figure 22:
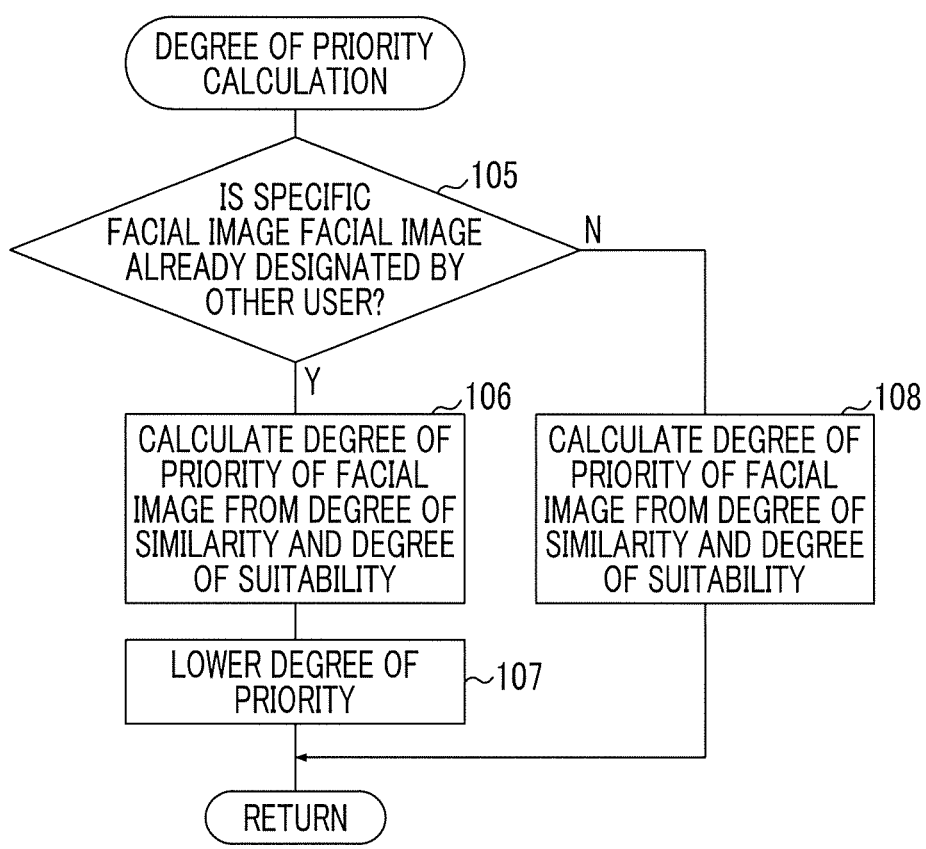
FIG. 22 is a flowchart illustrating a priority determination processing procedure.

FIG. 22 is a flowchart illustrating a modification example of a degree of degree of priority calculation process procedure (the processing procedure of step 77 in FIG. 11).

In the degree of priority calculation process procedure, the priority of the facial image designated by another user (an example of a second user) different from the user (an example of a first user) designating a facial image using a mouse (the first facial image designation unit or the second facial image designation unit) of the user terminal 1 as described above is lowered.

First, it is confirmed whether the specific facial image designated by the user operating the user terminal 1 is a facial image already designated as the specific facial image by the other user, by referring to the specific face table (step 105). If the specific facial image designated by the user operating the user terminal 1 is the facial image already designated as the specific facial image by the other user (YES in step 105), the degree of priority is calculated from the degree of similarity to the designated facial image and the degree of suitability, as described above (step 106), and the calculated degree of priority is lowered by the CPU 21 (the first priority correction unit) (step 107). For example, by multiplying the calculated degree of priority by a coefficient greater than 0 and smaller than 1, the calculated degree of priority is lowered. Since it is rare that the facial image already designated as the specific facial image by the other user is considered as a facial image that is looked for by the user operating the user terminal 1, the degree of priority is lowered, and accordingly, a probability of being displayed in the second facial image display area 92 is reduced. However, since there may be a case where the facial image is designated as the specific facial image by mistake by another user, the priority is high even when the degree of priority is lowered in a case where the degree of priority before the degree of priority is lowered is relatively high, and accordingly, the facial images are displayed in the second facial image display area 92, making it possible to designate the specific facial image designated by mistake by another user. If the facial image is not a facial image already designated as the specific facial image by another user (NO in step 105), the process of lowering the degree of priority is not performed on the degree of priority calculated from the degree of similarity and the degree of suitability (step 108).

Figure 23:
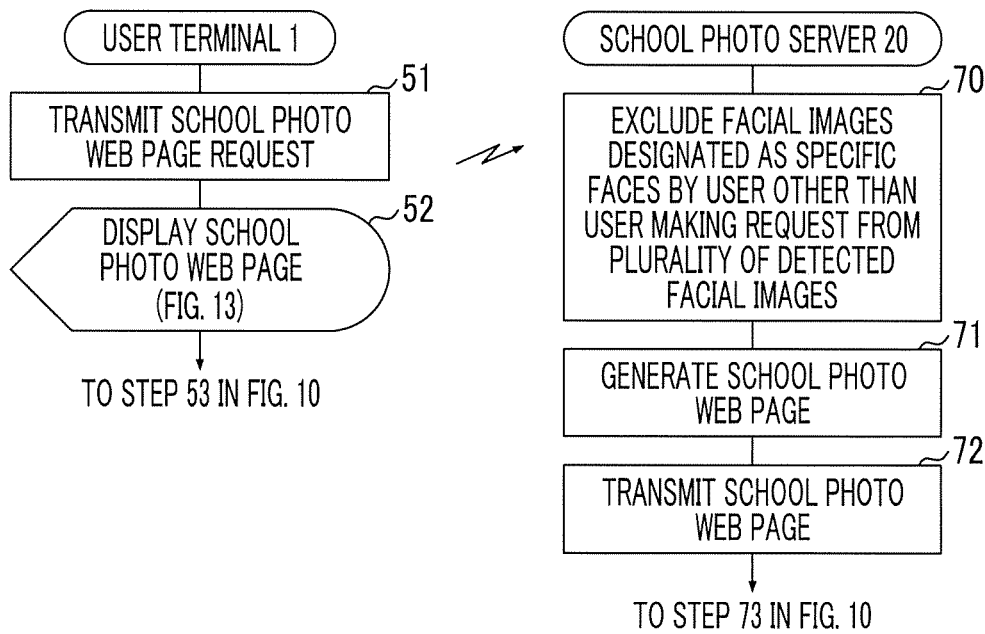
FIG. 23 is a flowchart illustrating a portion of a processing procedure of the school photo system.

FIG. 23 is a flowchart illustrating a portion of the processing procedure of the school photo system. In FIG. 23, a left flowchart illustrates a processing procedure in the user terminal 1, and a right flowchart illustrates a processing procedure in the school photo server 20.

If the school photo web page request and the user ID are transmitted from the user terminal 1 to the school photo server 20 as described above (step 51) and the request and the user ID are received in the school photo server 20, the facial images designated as specific faces by a user other than the user making the request are excluded from the plurality of detected facial images (step 70).

When the school photo request is transmitted from the user terminal 1, the facial images designated as specific faces by the user other than the user making the request are excluded from a plurality of detected facial images since all the facial images stored in the facial image database 25 become such a plurality of detected facial image.

Whether the facial image is facial image designated as a specific face by the user other than the user making the request can be recognized by referring to the specific facial table. The facial images remaining by excluding the facial image designated as a specific face by the user other than the user making the request from all the facial images stored in the facial image database 25 are caused to be a plurality of new detected facial images by the CPU 21 (an example of a process of the second updating unit). A school photo web page in which the plurality of new detected facial images are displayed in the first facial image display area 91 is generated (step 71), the generated school photo web page is transmitted from the school photo server 20 to the user terminal 1 (step 72).

Thus, the facial images remaining by excluding the facial image already designated by the second user different from the first user designating the facial image using the mouse (an example of the first facial image designation unit and the second facial image designation unit) of the user terminal 1 from the plurality of detected facial images are caused to be a plurality of new detected facial images. Accordingly, since the facial image designated by another user is not displayed in the first facial image display area 91 included in the school photo web page displayed in the display screen of the display device 4 of the user terminal 1, it is possible to prevent the facial image designated by the other user from being erroneously designated as the specific face.

Figure 24:
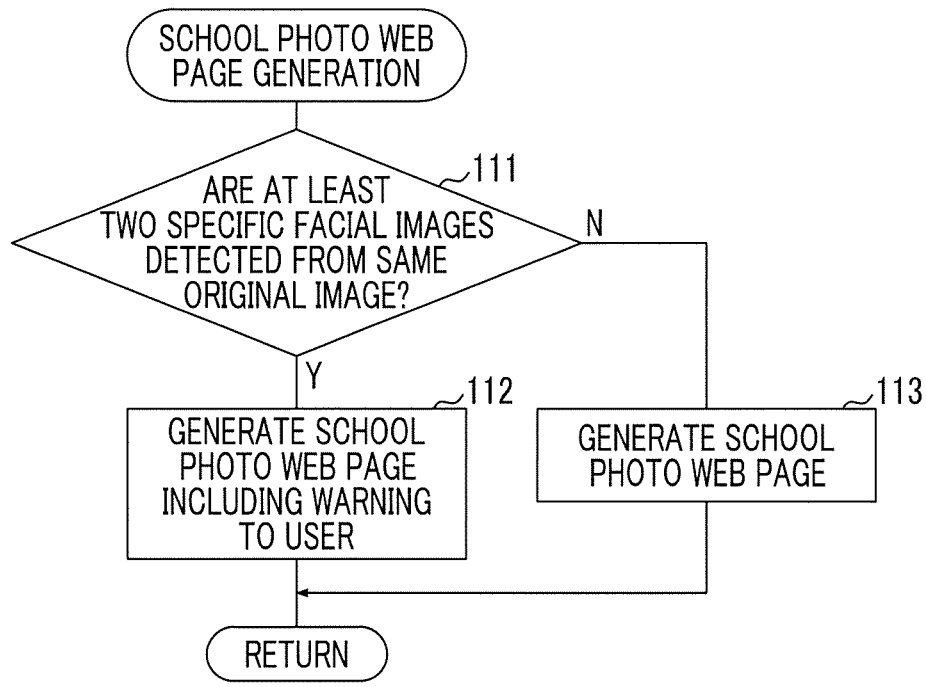
FIG. 24 is a flowchart illustrating a school photo web page generation processing procedure.

FIG. 24 illustrates an example of a modification example of the school photo web page generation process procedure (the processing procedure of step 81 in FIG. 12).

In this processing procedure, in a case where the facial image that the user selects from among the facial images (an example of the plurality of detected facial images) displayed in the first facial image display area 91 using the mouse (an example of the first facial image designation unit) in step 53 of FIG. 10, and the facial image that the user selects from among the facial images (an example of the similar facial image candidates) displayed in the second facial image display area 92 using the mouse (an example of the second facial image designation unit) in step 57 of FIG. 12 are facial images detected from the same original image, or in a case where a plurality of facial images obtained by performing, a plurality of times, a process in which the user selects facial images from among the facial images (an example of the similar facial image candidates) displayed in the second facial image display area 92 using the mouse (an example of the second facial image designation unit) in step 57 of FIG. 12 are the facial images detected from the same original image, a school photo web page including a warning to the user is generated. This is because, the facial image that the user is looking for is a facial image of one specific person or the like, in a case where a plurality of facial images are included in one original image, all of the plurality of facial images are not the specific person.

As described above, it is confirmed whether at least two specific facial images determined by the user are detected from the same original image (step 111). This can be confirmed by referring to the relevant information table or the degree-of-suitability table. In a case where the specific facial images are detected from the same original image (YES in step 111), a school photo web page including a warning statement to the user (an example of the process of the second warning unit) is generated by the CPU 21 (step 112). In a case where the specific facial images are not detected from the same original image (NO in step 111), a school photo web pages not including the warning statement is generated (step 113). The generated school photo web page is transmitted from the school photo server 20 to the user terminal 1.

Figure 25:
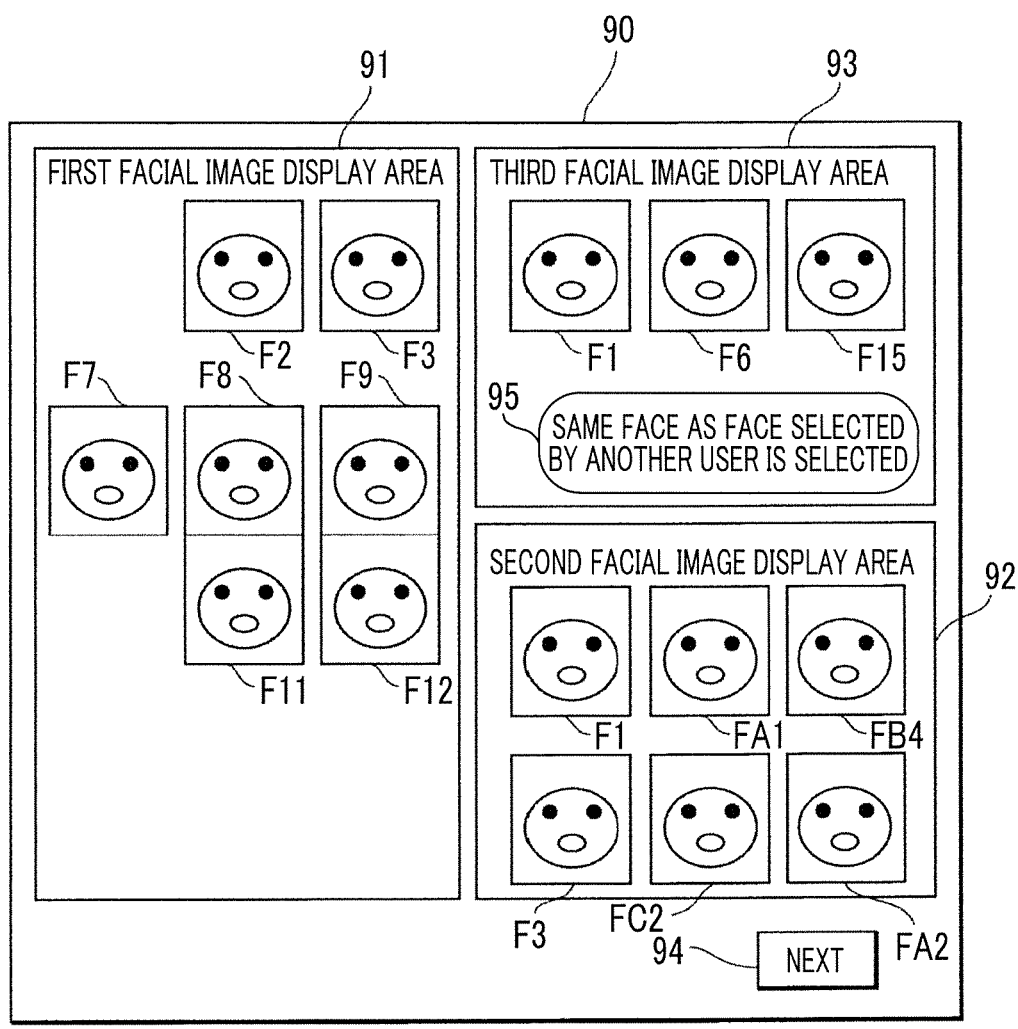
FIG. 25 illustrates an example of a window displayed on the user terminal.

FIG. 25 illustrates an example of the window 90 included in the school photo web page displayed in the display screen of the display device 4 of the user terminal 1.

The warning statement 95 is displayed in the third of the facial image display area 93. The warning statement 95 may be displayed in an area other than the third facial image display area 93. The user can recognize a facial image other than the facial image that the user is looking for is likely to be included in the facial images displayed as the specific facial images in the third facial image display area 93 by viewing the warning statement 95. Thus, warning can be performed according to at least two facial images designated by the user of the user terminal 1 using the mouse (an example of the first facial image designation unit and the second facial image designation unit) being detected from the same original image.

Figure 26:
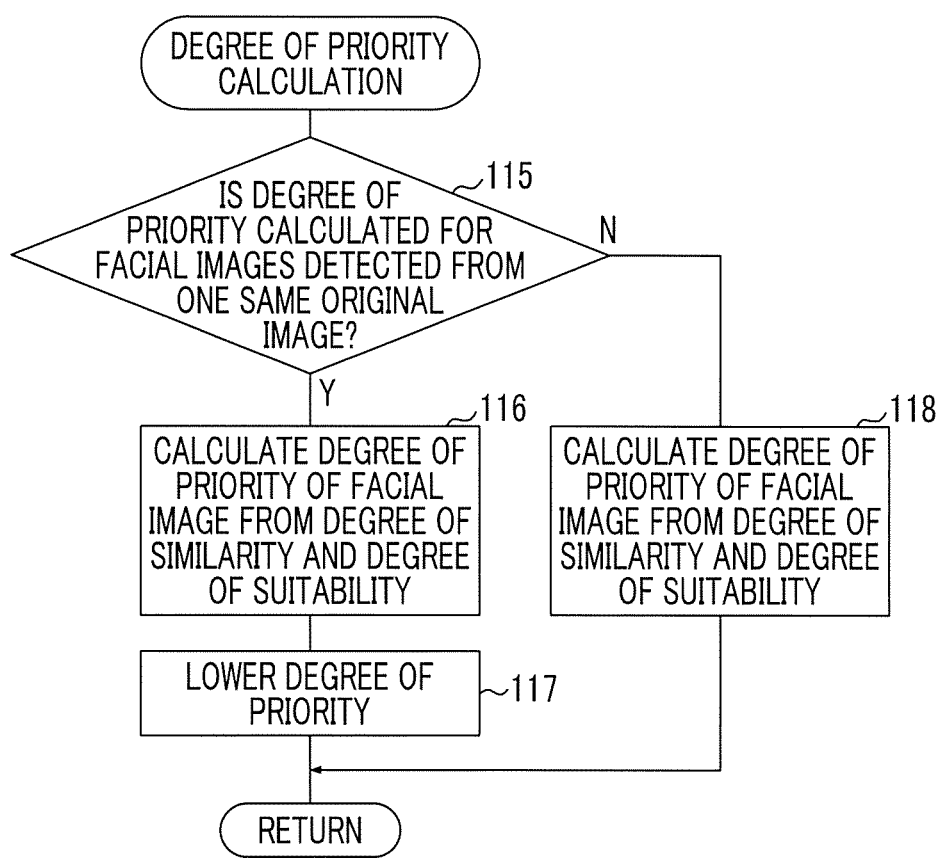
FIG. 26 is a flowchart illustrating a degree of priority determination processing procedure.

FIG. 26 is a flowchart illustrating a modification example of the degree of priority calculation processing procedure (the processing procedure of step 77 in FIG. 11).

In this processing procedure, the degree of priority of the facial image other than the specific facial image among the facial images included in the original image determined as the specific facial image is lowered.

First, whether the degree of priority is calculated for the facial images detected from the same original image as the specific facial image that has already been determined is confirmed by referring to the relevant information table (step 115). In a case where the priority of such a facial image is calculated (YES in step 115), the degree of priority of the facial image is calculated from the degree of similarity and the degree of suitability (step 116), and the calculated degree of priority is lowered by the CPU 21 (step 117) (an example of an operation of second priority correction unit). In a case where the facial image which the user is looking for is considered to be a facial image for a certain person, and in such a case, since it is considered that the facial image which the user is looking for is not included in the same original image as the specific facial image, the degree of priority displayed in the second facial image display area 92 is lowered. In a case where the degree of priority is not calculated for the facial images detected from the same original image as the specific facial image that has already been determined (NO in step 115), the process of lowering the degree of priority is not performed (step 118).

In the process illustrated in FIG. 26, although the degree of priority of the facial image detected from the same original image as the specific facial image that has already been determined is lowered, the facial image remaining by excluding the facial image determined as the specific facial image among the facial images included in the original image determined as the specific facial image may be deleted from the plurality of detected facial images by the CPU 21 if the specific facial image is determined, instead of lowering the degree of priority (an example of a process of the deletion unit). For example, in a case where three persons including Mr. A, Mr. B, and Mr. C are included in the same original image and a facial image of Mr. A is selected as the specific facial image, facial images of Mr. B and Mr. C included in the same original image are deleted from the plurality of detected facial images. Accordingly, the facial images of Mr. B and Mr. C included in the same original image are not displayed in the first facial image display area 91. In the detected facial image table illustrated in FIG. 19, information on the facial images other than the facial image determined as the specific facial image among the facial images included in the original image determined as the specific facial image may not be stored. For example, in a case where three persons including Mr. A, Mr. B, and Mr. C are included in the same original image and the facial image of Mr. A is selected as the specific facial image, facial images F2 and F3 are deleted from the detected facial image table if the facial image of Mr. A is an image F1, the facial image of Mr. B is the image F2, and the facial image of Mr. C is the image F3 in FIG. 19. Accordingly, the facial image F2 of Mr. B and the facial image of Mr. C are prevented from being displayed in the second facial image display area 92.

Figure 27:
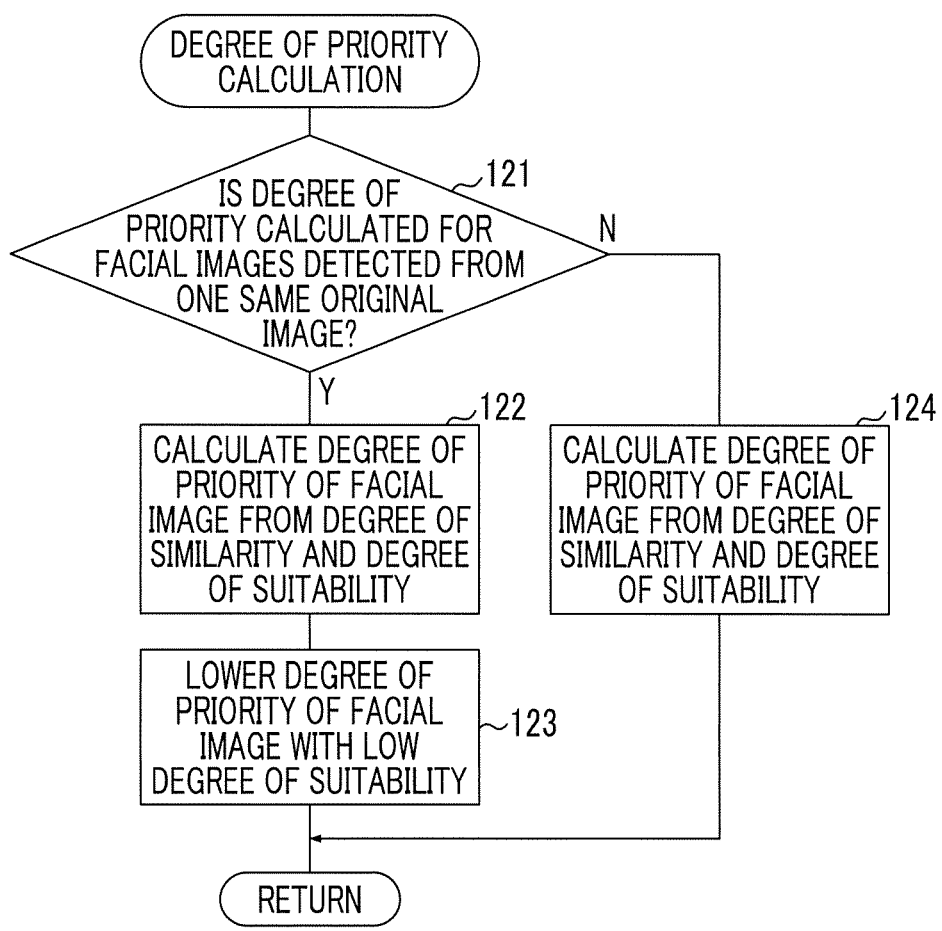
FIG. 27 is a flowchart illustrating a degree of priority determination processing procedure.

FIG. 27 is a flowchart illustrating another modification example of the degree of priority calculation processing procedure (the processing procedure of step 77 in FIG. 11).

In this processing procedure, for a plurality of facial images included in the same original image, a degree of priority is lowered when the degree of suitability is lower. Whether the facial images are included in the same original image can be recognized by referring to the relevant information table.

Whether the degree of priority is calculated for the facial images detected from one same original image, is confirmed (step 121). If the degree of priority is calculated for the facial images detected from one same original image (YES in step 121), the degree of priority of the facial image with a low degree of suitability among the degrees of priority calculated from the degree of similarity and the degree of suitability (step 122) is lowered by the CPU 21 (step 123) (an example of the process of the third priority correction unit). If the degree of priority is not calculated for the facial images detected from one same original image (NO in step 121), the process of lowering the degree of priority of the facial image with a low degree of suitability is not performed (step 124). It is easy for the facial image with a high degree of suitability to be displayed in the second facial image display area 92.

Figure 28:
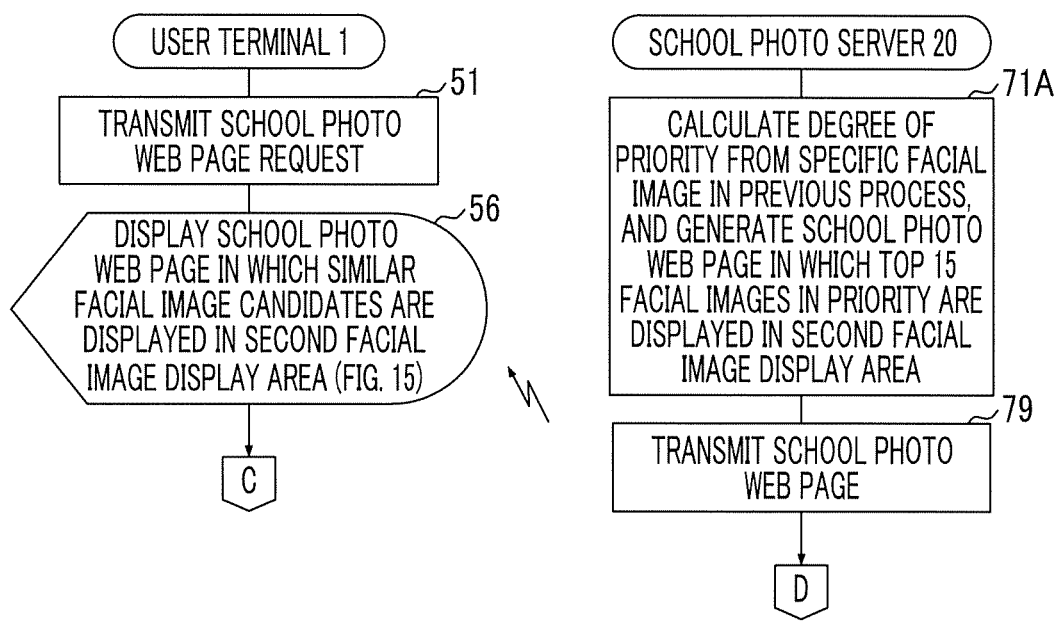
FIG. 28 is a flowchart illustrating a portion of a processing procedure of the school photo system.

FIG. 28 is a flowchart illustrating a portion of the processing procedure of the school photo system. In FIG. 28, a left flowchart illustrates a processing procedure in the user terminal 1, and a right flowchart illustrates a processing procedure in the school photo server 20.

In this processing procedure, facial images with top fifteen degrees of priority (an example of the degrees of priority up to a predetermined number) calculated for the plurality of detected facial images from the degree of similarity to the specific facial image determined by the same user in a previous process of the school photo server 20, and the degree of suitability are displayed as similar facial image candidates in the second facial image display area 92.

If the user ID and the school photo web page request are transmitted from the user terminal 1 to the school photo server 20 (step 51), the specific facial image designated in a previous process by the user specified by the user ID is read from the specific face table. If necessary, a designation day of the specific facial image designated by the user is stored in the specific face table, and a specific facial image designated in the previous process is recognized. A degree of priority is calculated for a plurality of detected facial images (the facial images updated as described above and remaining in the detected facial image table) from the specific facial image designated in the previous process, and the school photo web page is generated by the CPU 21 so that top fifteen facial images with the calculated degree of priority are displayed in the second facial image display area 92 (step 71A). The generated school photo web page is transmitted from the school photo server 20 to the user terminal 1 (step 72). Further, for the specific facial image designated in the previous process, the degree of priority may be calculated for all detected facial images stored in the facial image database 25, and top fifteen facial images with the calculated degree of priority may be displayed in the second facial image display area 92.

Since facial images displayed as similar facial image candidates in the second facial image display area 92 are determined using the specific facial image designated in the previous process, time until the facial images are displayed in the second facial image display area 92 is shortened. Thus, the facial images with the degree of priority up to a predetermined number in the previous process are displayed in the second facial image display area 92 as similar facial image candidates by the CPU 21, the communication device 22, and the communication control device 23 of the school photo server 20 (an example of an operation of the fourth display control unit).

Figure 29:
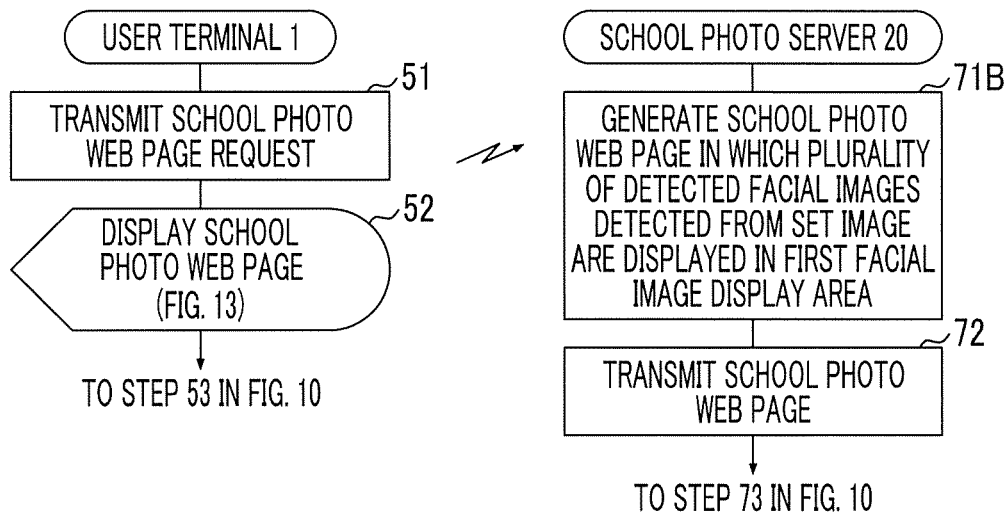
FIG. 29 is a flowchart illustrating a portion of a processing procedure of the school photo system.

FIG. 29 is a flowchart illustrating a portion of the processing procedure of the school photo system. In FIG. 29, a left flowchart illustrates a processing procedure in the user terminal 1, and a right flowchart illustrates a processing procedure in the school photo server 20.

The school photo web page request and the user ID are transmitted from the user terminal 1 to the school photo server 20 as described above (step 51), and if the request and the user ID are received in the school photo server 20, the facial images detected from the set image (the original image including the plurality of facial images) among the plurality of detected facial images stored in the facial image database 25 are caused to be a plurality of new detected facial images by the CPU 21 of the school photo server 20. A school photo web page in which the plurality of new detected facial images are displayed in the first facial image display area 91 is generated by the CPU 21 (step 71B). The generated school photo web page is transmitted from the school photo server 20 to the user terminal 1 (step 72).

If the school photo web page transmitted from the school photo server 20 is received in the user terminal 1, a school photo web page in which the facial image detected from the set image is displayed in the first facial image display area 91 is displayed in the display screen of the display device 4 of the user terminal 1.

Figure 30:
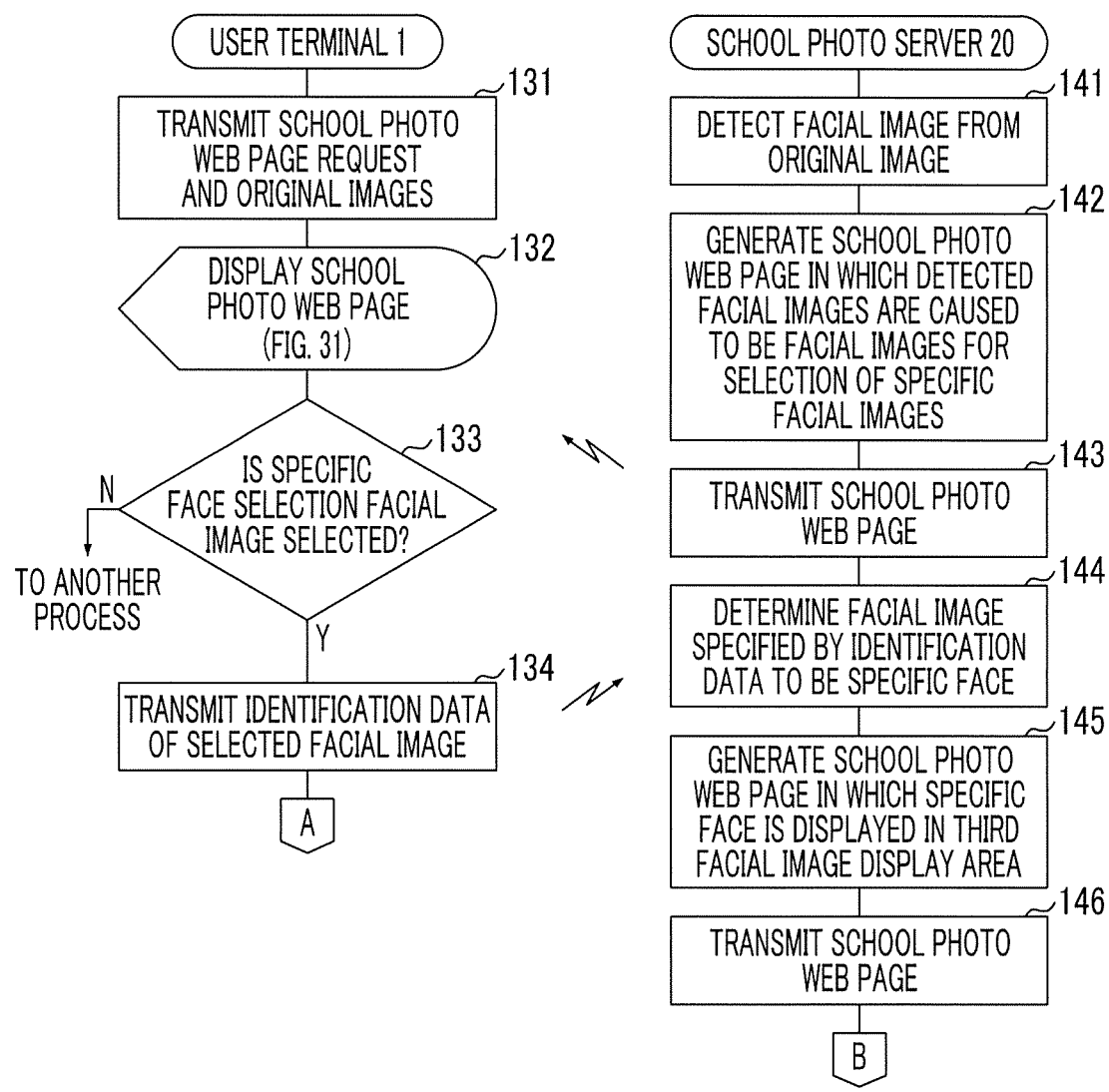
FIG. 30 is a flowchart illustrating a portion of the processing procedure of the school photo system.

FIG. 30 is a flowchart illustrating a portion of the processing procedure of the school photo system. In FIG. 30, a left flowchart illustrates a processing procedure in the user terminal 1, and a right flowchart illustrates a processing procedure in the school photo server 20.

One or more original images (one or more original images) owned by the user and the school photo web page request are transmitted from the user terminal 1 to the school photo server 20 (step 131).

In the school photo server 20, the one or more original images transmitted from the user terminal 1 are received in the communication device 22 (an example of the original image input unit that inputs a plurality of original images), and are stored in the original image database 24. A plurality of facial images are detected from the one or more original images transmitted from the user terminal 1 among the plurality of original images stored in the original image database 24 by the CPU 21 (an example of the process of the facial image detection unit). The one or more detected facial images are stored in the facial image database 25. Further, a school photo web page in which the one or more detected facial images are caused to be facial images for selection of specific facial images is generated by the CPU 21 (step 142). The generated school photo web page is transmitted from the school photo server 20 to the user terminal 1 (step 143).

If the school photo web page transmitted from the school photo server 20 is received in the user terminal 1, a school photo web page including a facial image for selection of a specific facial image is displayed in the display screen of the display device 4 of the user terminal 1 (step 132).

Figure 31:
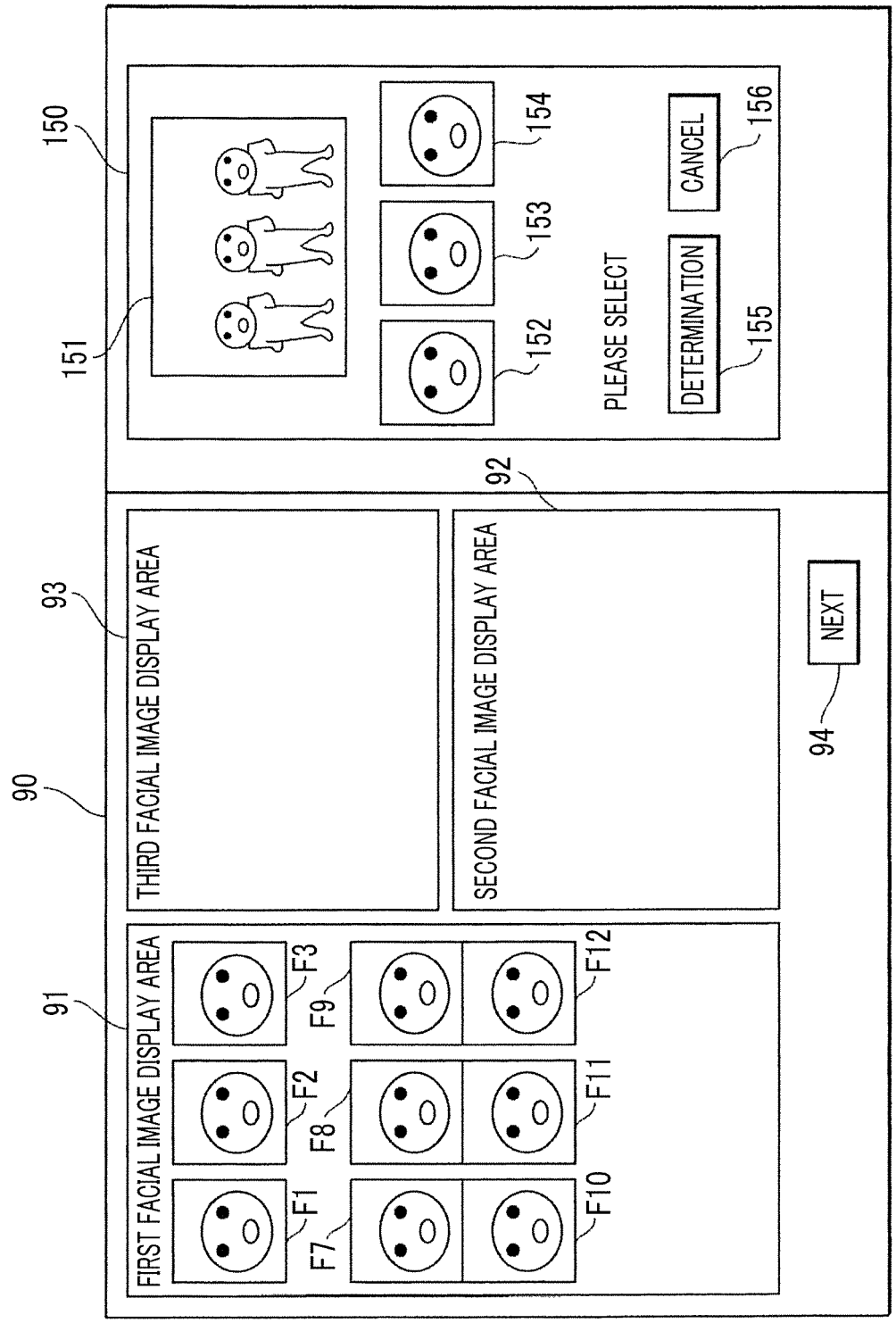
FIG. 31 illustrates an example of a window displayed on the user terminal.

FIG. 31 is an example of a school photo web page that is displayed in the display screen of the display device 4 of the user terminal 1.

In a window 90 that is included in the school photo web page, a specific face selection facial image display area 150 is included, in addition to the first facial image display area 91, the second facial image display area 92, and the third facial image display area 93.

An original image display area 151 in which original images input by the user are displayed, an area in which facial images 152, 153, and 154 detected from the original images are displayed, a determination button 155 in which a character of a determination is displayed, and a cancel button 156 in which a character of cancel is displayed are included in the specific face selection facial image display area 150. In a case where the facial image selected as the specific face is one of the facial images 152, 153, and 154, the facial image to be selected is clicked by the user using the mouse. If the determination button 155 is clicked after the facial image to be selected is clicked, selection of the facial image is performed, and if the cancel button 156 is clicked after the facial image to be selected is clicked, selection of the clicked facial image is canceled.

Referring back to FIG. 30, if any one of the facial images for specific face selection is selected by the user (YES in step 133), identification data of the selected facial image is transmitted from the user terminal 1 to the school photo server 20 (step 134).

When the identification data transmitted from the user terminal 1 is received in the school photo server 20, the facial image specified by the identification data is determined to be the specific face by the CPU 21 of the school photo server 20 (step 144). A school photo web page in which the determined specific face is displayed in the third facial image display area is generated (step 145), and the generated school photo web page is transmitted from the school photo server 20 to the user terminal 1 (step 146).

The window 90 in which the specific face is displayed in the third facial image display area 93 is displayed in the display screen of the display device 4 of the user terminal 1, as illustrated in FIG. 14.

It is needless to say that the degree of suitability is calculated for the detected facial image detected from the original image transmitted from the user by the CPU 21 of the school photo server 20 in such a way (the degree of suitability calculation unit).

FIGS. 32 to 35 relate to a process of displaying an expected number of facial images.

Figure 32:
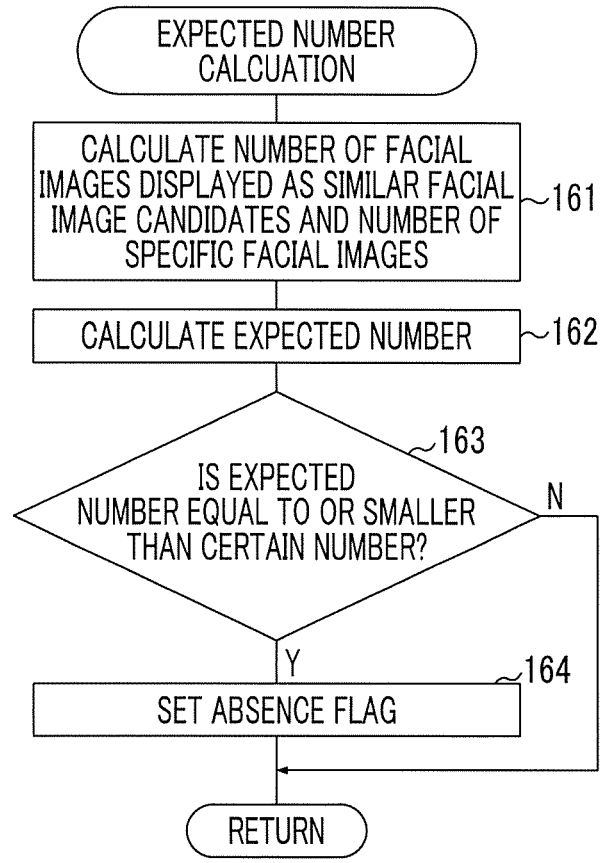
FIG. 32 is a flowchart illustrating an expected number calculation processing procedure.

FIG. 32 is a flowchart illustrating an expected number calculation processing procedure (a processing procedure performed during the process of step 77 in FIG. 11).

First, the number of facial images displayed as similar facial image candidates in the second facial image display area 92 and the number of the specific facial images designated by the user are calculated by the CPU 21 (step 161). The expected number of facial images is calculated from the numbers by the CPU 21 as follows (an example of the expected number calculation unit) (step 162).

Figure 33:
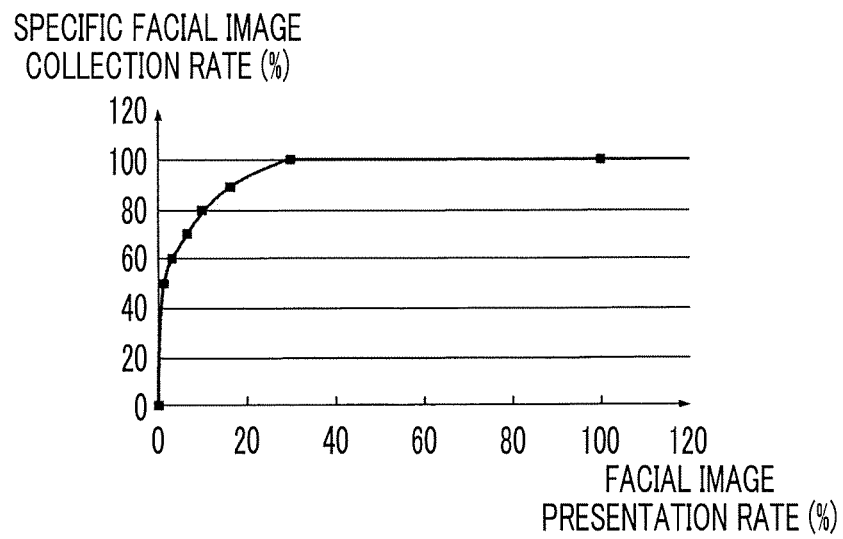
FIG. 33 illustrates a relationship between a facial image presentation rate and a specific facial image collection rate.

FIG. 33 illustrates a relationship between a facial image presentation rate and a specific facial image collection rate.

The facial image presentation rate indicates a rate of the facial images displayed as the similar facial image candidates in the second facial image display area 92 to all the detected facial images stored in the facial image database 25. The specific facial image collection rate indicates a proportion of specific facial images considered as being designated by the user among all of the detected facial images stored in the facial image database 25 in a case where facial images are displayed as the facial image candidates by a proportion indicated by the facial image presentation rate. For example, the specific facial image collection rate is about 50% in a case where the facial image presentation rate is 2%, and this indicates the facial images of 50% among facial images designated by the user, which are included in the detected facial images stored in the facial image database 25, are designated as specific facial images in a case where the facial image presentation rate is 2%. The specific facial image collection rate is about 60% in a case where the facial image presentation rate is 3%, the specific facial image collection rate is about 70% in a case where the facial image presentation rate is 5%, the specific facial image collection rate is about 80% in a case where the facial image presentation rate is 10%, the specific facial image collection rate is about 90% in a case where the facial image presentation rate is 15%, and the specific facial image collection rate is about 100% in a case where the facial image presentation rate is 30%. If the facial image presentation rate is about 30%, the user designates all of the facial images to be looked for as specific facial images. A relationship between the facial image presentation rate and the specific facial image collection rate is obtained by actually performing using a sample.

Since the specific facial image collection rate can be represented by a function f of the facial image presentation rate, the specific facial image collection rate can be represented by specific facial image collection rate=f (facial image presentation rate). Further, if the number of the plurality of detected facial images stored in the facial image database 25 is a, the number of facial images already displayed as similar facial image candidates in the second facial image display area 92 is b, and the number of facial images already designated as the specific facial images is c, Equation 1 is satisfied.

$$\text{Expected number of facial images} = c \times \{100/f(100 \times b/a)\} - c \quad \text{Equation 1}$$

In Equation 1, the item $c \times \{100/f(100 \times b/a)\}$ indicates the expected number of specific facial images designated by the user, which are included in all of the detected facial images stored in the facial image database 25.

If the number of a plurality of detected facial images stored in the facial image database 25 is 1000 (a=1000), the number of facial images already displayed as the similar facial image candidates in the second facial image display area 92 is 100 (b=100), and the number of facial images already designated as the specific facial images is 10 (c=10), Equation 1 becomes Equation 2.

$$\text{Expected number} = 10 \times \{100/f(100 \times 100/1000)\} - 10 \quad \text{Equation 2}$$

In Equation 2, f (100×100/1000) is Equation 3.

$$f(100 \times 100/1000) = f(10) \quad \text{Equation 3}$$

Since the specific facial image collection rate=f (facial image presentation rate), Equation 3 becomes Equation 4 from a relationship between the specific facial image collection rate and the facial image presentation rate illustrated in FIG. 33.

$$f(10) = 80 \quad \text{Equation 4}$$

Equation 2 becomes Equation 5 from Equation 3 and Equation 4.

$$\text{Expected number} = 10 \times (100/80) - 10 \quad \text{Equation 5}$$

If Equation 5 is solved, the expected number of remaining facial images designated as the specific facial images by the user becomes 2.5.

Referring back to FIG. 32, if the calculated number is equal to or smaller than a predetermined number (for example, one) (YES in step 163), it is considered that facial images which the user is looking for hardly remain in the detected facial images not displayed in the second facial image display area 92 among all of the plurality of detected facial images stored in the facial image database 25. Therefore, an absence flag is set (step 164). If the calculated number is not equal to or smaller than the predetermined number (NO in step 163), it is considered that a certain number or more of facial images which the user is looking for still remain in the detected facial images not displayed in the second facial image display area 92 among all of the plurality of detected facial images stored in the facial image database 25, the process of step 164 is skipped.

Figure 34:
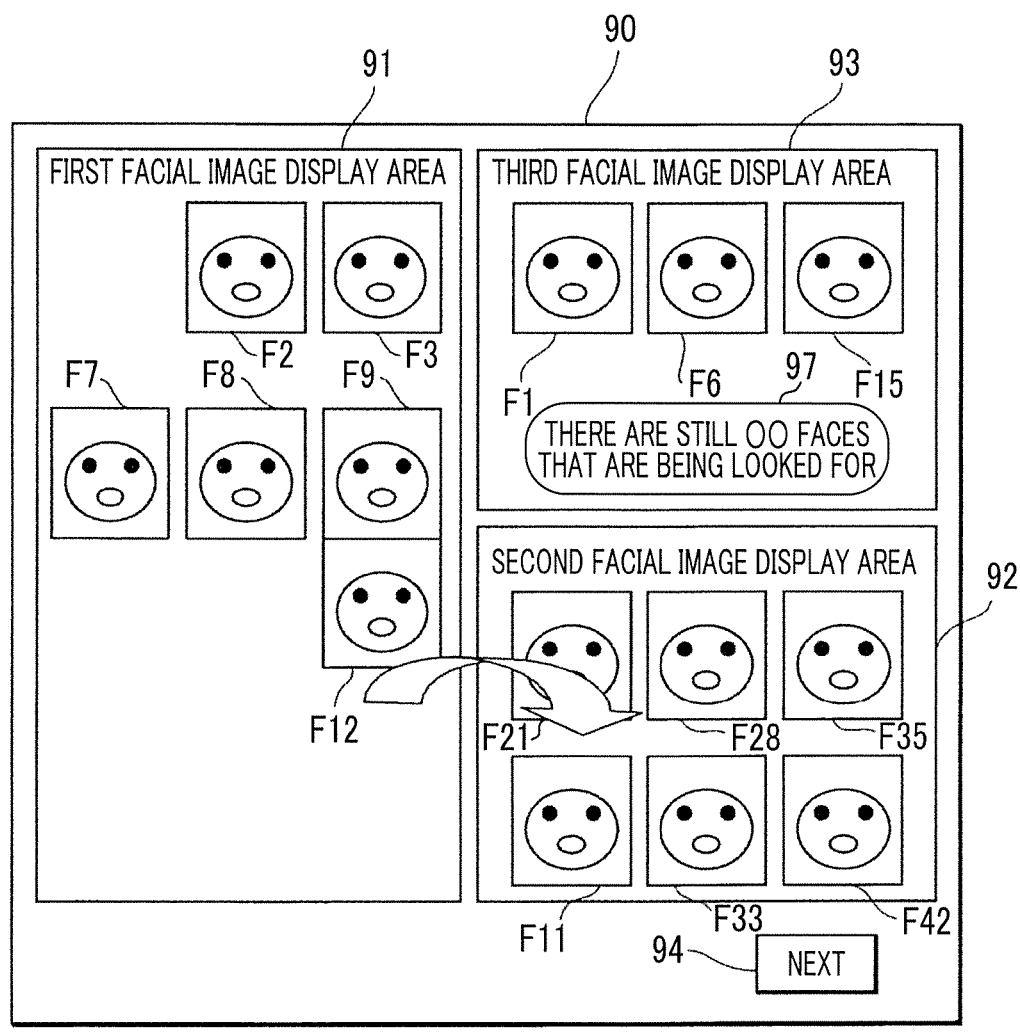
FIG. 34 illustrates an example of a window displayed on the user terminal.

FIG. 34 is an example of a window 90 that is included in the school photo web page.

If the expected number of facial images is calculated as described above, the calculated number is displayed in the third facial image display area 93 (may be displayed in an area other than the third facial image display area 93). An expected number of facial images display area 97 is formed in the third facial image display area 93, and the calculated expected number of facial images is displayed in the expected number of facial images display area 97. A school photo web page in which the expected number of facial images display area 97 is displayed as illustrated in FIG. 34 is generated by the CPU 21 of the school photo server 20, and the generated school photo web page is transmitted from the school photo server 20 to the user terminal 1, such that the window 90 as illustrated in FIG. 34 is displayed in the display screen of the display device 4 of the user terminal 1. Thus, the expected number of facial images is displayed by the CPU 21, the communication device 22, and the communication control device 23 of the school photo server 20 (an example of the fourth display control unit).

Figure 35:
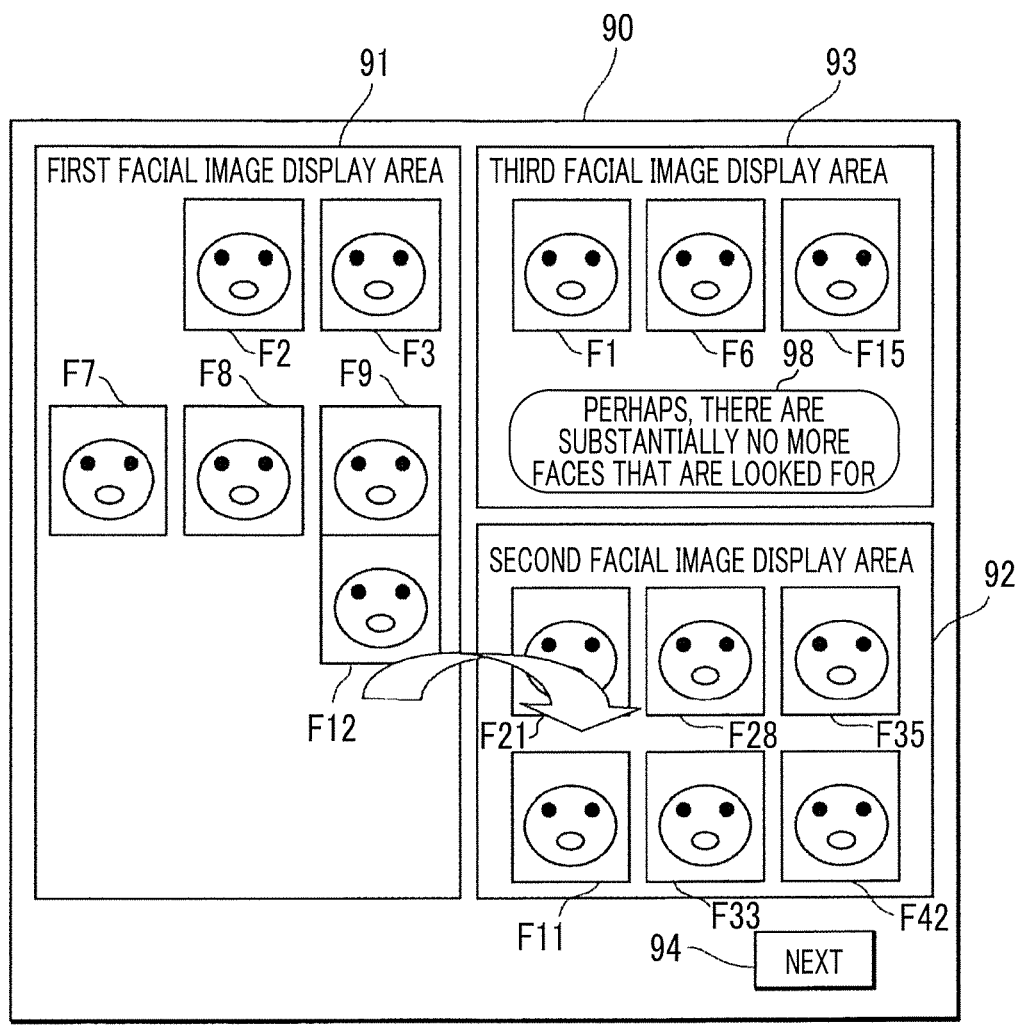
FIG. 35 illustrates an example of a window displayed on the user terminal.

Further, in a case where the absence flag is set as described above (the process of step 164 in FIG. 32), a school photo web page including a window 90 as illustrated in FIG. 35 is generated by the CPU 21 of the school photo server 20.

Referring to FIG. 35, a warning area 98 is formed in the third facial image display area 93. "Perhaps, there are substantially no more faces that are looked for" is displayed in the warning area 98 to inform that the facial image that the user is looking for does not probably remain.

It is needless to say that the warning area 98 may be displayed in an area other than the third facial image display area 93. Thus, the school photo web page including the window 90 illustrated in FIG. 35 is generated by the CPU 21 of the school photo server 20, and can warn the user (an example of the third warning unit).

Figure 36:
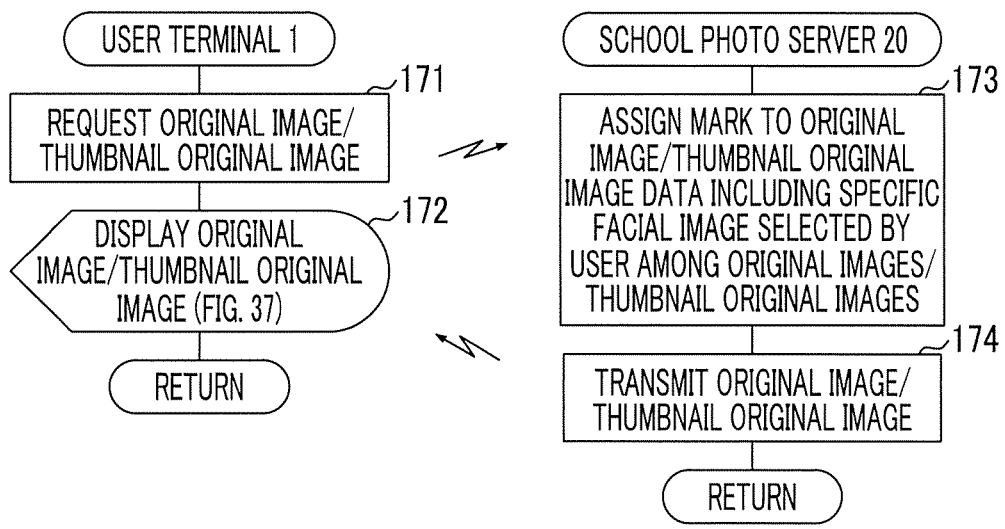
FIG. 36 is a flowchart illustrating a portion of a processing procedure of the school photo system.

FIG. 36 is a flowchart illustrating a portion of the processing procedure of the school photo system. In FIG. 36, a left flowchart illustrates a processing procedure in the user terminal 1, and a right flowchart illustrates a processing procedure in the school photo server 20.

This processing procedure is performed after the specific face is selected by the user as described above.

A request for the original image/thumbnail original image is transmitted from the user terminal 1 to the school photo server 20 (step 171).

If the request transmitted from the user terminal 1 is received in the school photo server 20, a mark is assigned to the original image and the thumbnail original image including the specific facial image selected by the user among the original image and the thumbnail original image stored in the original image database 24 (the thumbnail original image is generated from the original image and the thumbnail original image is also stored in the original image database 24) (step 173). The original image to which the mark has been assigned, the thumbnail original image to which the mark has been assigned, the original image to which the mark has not been assigned, and the thumbnail original image to which the mark has not been assigned are transmitted from the school photo server 20 to the user terminal 1 (step 74).

If the original image and the thumbnail original image are received in the user terminal 1, the original image and the thumbnail original image are displayed in the display screen of the display device 4 of the user terminal 1 (step 172).

Figure 37:
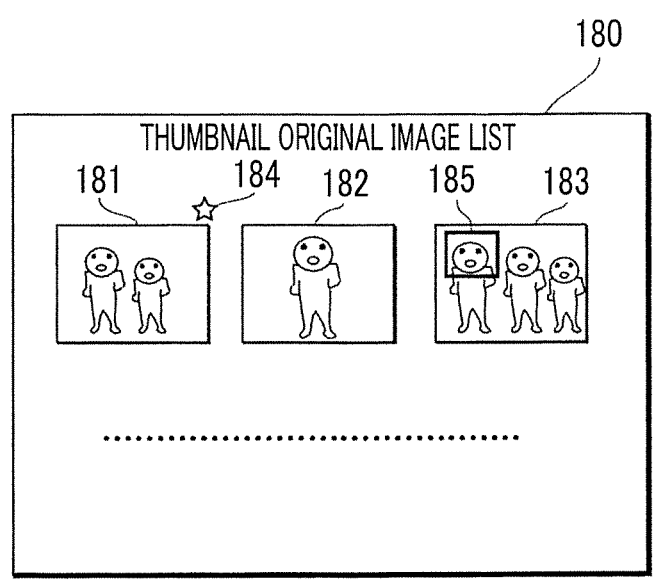
FIG. 37 illustrates an example of a window displayed on the user terminal.

FIG. 37 illustrates an example of a thumbnail original image list display window 180.

In the thumbnail original image list display window 180, a large number of thumbnail original images stored in the original image database 24 are displayed as a list. A mark (asterisk) 184 is assigned around the thumbnail original image including the facial image selected as a specific face by the user among displayed thumbnail original images 181, 182, and 183. The user can confirm the thumbnail original image including the selected facial image by looking for the mark 184. If printing is required, a print command for the original image corresponding to the thumbnail original image is transmitted from the user terminal 1 to the school photo server 20. The original image itself may be assigned with the mark and displayed instead of the thumbnail original image being displayed, or both of the original image and the thumbnail original image may be assigned with the mark and displayed. Further, a portion corresponding to the selected specific face may be surrounded by a shape 185 such as a rectangle, instead of the mark 184. Such a shape 185 is also a mark. A surrounding position is found by reading coordinates of the face for the facial image selected as the specific face from the relevant information table.

Thus, the original image including the facial images displayed in the third image display area 93 or a thumbnail image of the original image may be assigned with the mark and displayed by the CPU 21, the communication device 22, and the communication control device 23 of the school photo server 20 (the fifth display control unit).

Although the original image or the thumbnail original image including the specific facial image selected by the user are assigned with the mark and displayed in the embodiment illustrated in FIGS. 36 and 37, a mark indicating non-confirmation may be assigned to the original image or the thumbnail original image of the original image including each facial image among the plurality of new detected facial images updated and displayed in the first facial image display area 91 rather than the specific image, and the original image or the thumbnail original image of the original image may be displayed by the CPU 21, the communication device 22, and the communication control device 23 (an example of the process of the seventh display control unit). For example, if an asterisk 184 is a mark indicating non-confirmation in FIG. 37, it is found that the facial image included in the original image 181 is an image that is not displayed in the second facial image display area 92 and that is a non-confirmed original image or thumbnail original image by the user as described above.

Further, the shape 185 indicated in the original image 183 of FIG. 37 may indicate a non-confirmed facial image. In this case, in the facial image surrounded by the shape 185, a mark indicating non-confirmation is assigned as the shape 185 in the facial image displayed in the first facial image display area 91 (the facial image included in the plurality of new detected facial images) among the non-confirmed original images or non-confirmed thumbnail original images. Such a display is controlled by the CPU 21, the communication device 22, and the communication control device 23 of the school photo server 20 (an example of a process of the seventh display control unit).

Figure 38:
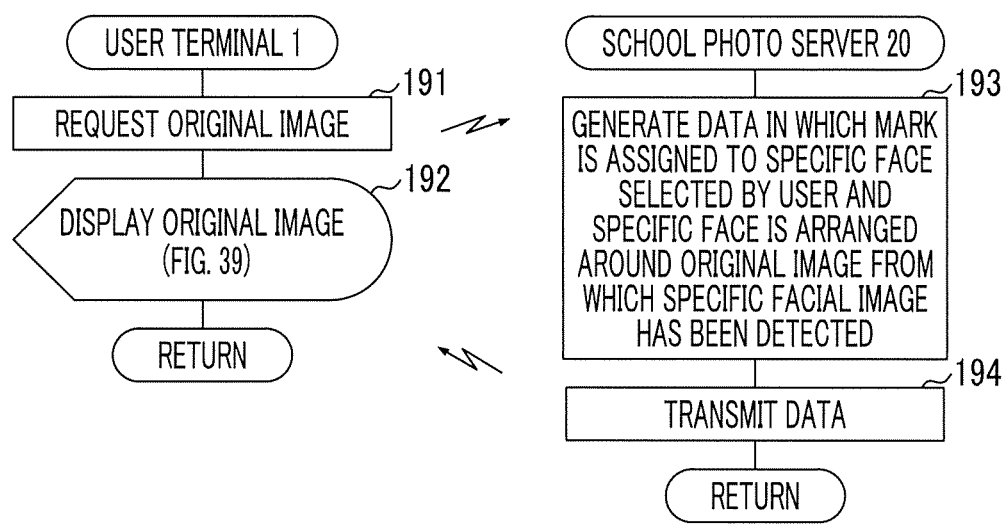
FIG. 38 is a flowchart illustrating a portion of a processing procedure of the school photo system.

FIG. 38 is a flowchart illustrating a portion of the processing procedure of the school photo system, and corresponds to FIG. 36. In FIG. 38, a left flowchart illustrates a processing procedure in the user terminal 1, and a right flowchart illustrates a processing procedure in the school photo server 20.

If an original image request is transmitted from the user terminal 1 to the school photo server 20 (step 191) and is received in the school photo server 20, data in which a mark is assigned to the specific face selected by the user and the specific face selected by the user is arranged around the original image from which the specific face has been detected and is displayed is generated by the CPU 21 of the school photo server 20 (step 193). The generated data is transmitted from the school photo server 20 to the user terminal 1 (step 194).

If the data transmitted from the school photo server 20 is received in the user terminal 1, the original image is displayed in the display screen of the display device 4 (step 192).

Figure 39:
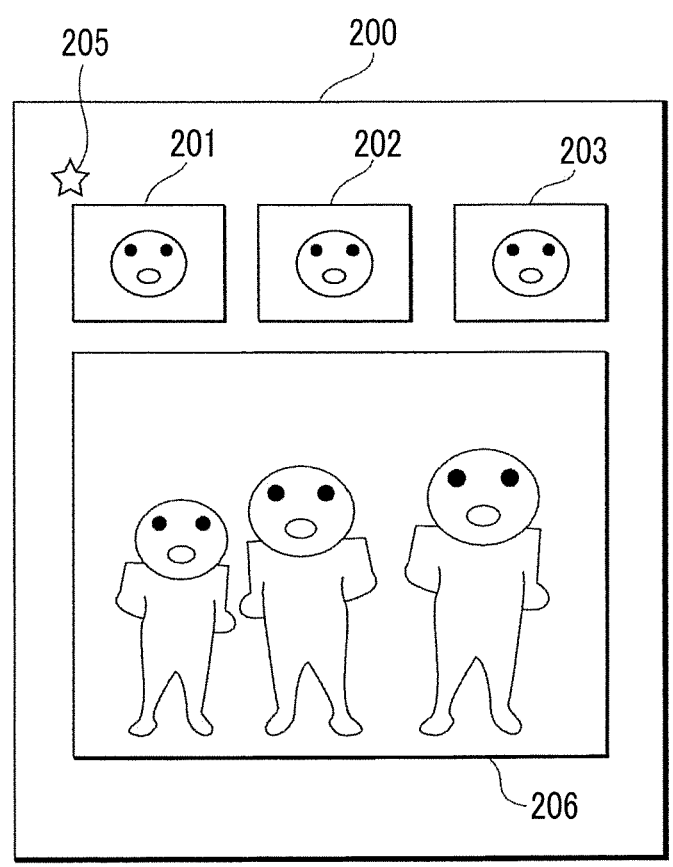
FIG. 39 illustrates an example of a window displayed on the user terminal.

FIG. 39 is an example of an original image display window that is displayed in the display screen of the display device 4 of the user terminal 1.

There is a region 206 in which an original image including the facial image selected as the specific face is displayed, and facial images 201, 202, and 203 detected from the area 206 are displayed above the area (an example of the vicinity) in the original image display window 230. A mark 205 is assigned to the specific face designated by the user among the facial images 201, 202, and 203. Since the original image and the facial images 201, 202, and 203 detected from the original image are displayed, and the mark 205 is assigned to the facial image 201 for the specific face, the user can confirm the original image from which the specific face has been selected and the specific face that has been selected.

Thus, the mark can be assigned to the specific facial image and the specific facial image can be displayed around the original image from which the specific facial image has been detected by the CPU 21, the communication device 22, and the communication control device 23 of the school photo server 20 (an example of the process of the sixth display control unit).

In the embodiment illustrated in FIGS. 38 and 39, a mark is assigned to the specific image selected by the user and the specific image is arranged around the original image from which the specific facial image has been detected. However, the plurality of new detected facial images after updating displayed in the first facial image display area 91 may be displayed with an asterisk 205 assigned around the original image from which the facial image is detected. In the example illustrated in FIG. 39, the facial images 201, 202, and 203 included in the original image 206 are displayed around the original image 206, the facial image 201 with the mark 205 is an facial image not displayed in the second facial image display area 92 and is an image not confirmed by the user, and the facial images 202 and 203 without the mark 205 are facial images displayed in the second facial image display area 92 and are images confirmed by the user. Such a display is controlled by the CPU 21, the communication device 22, and the communication control device 23 of the school photo server 20 (an example of a process of the eighth display control unit).

Figure 40:
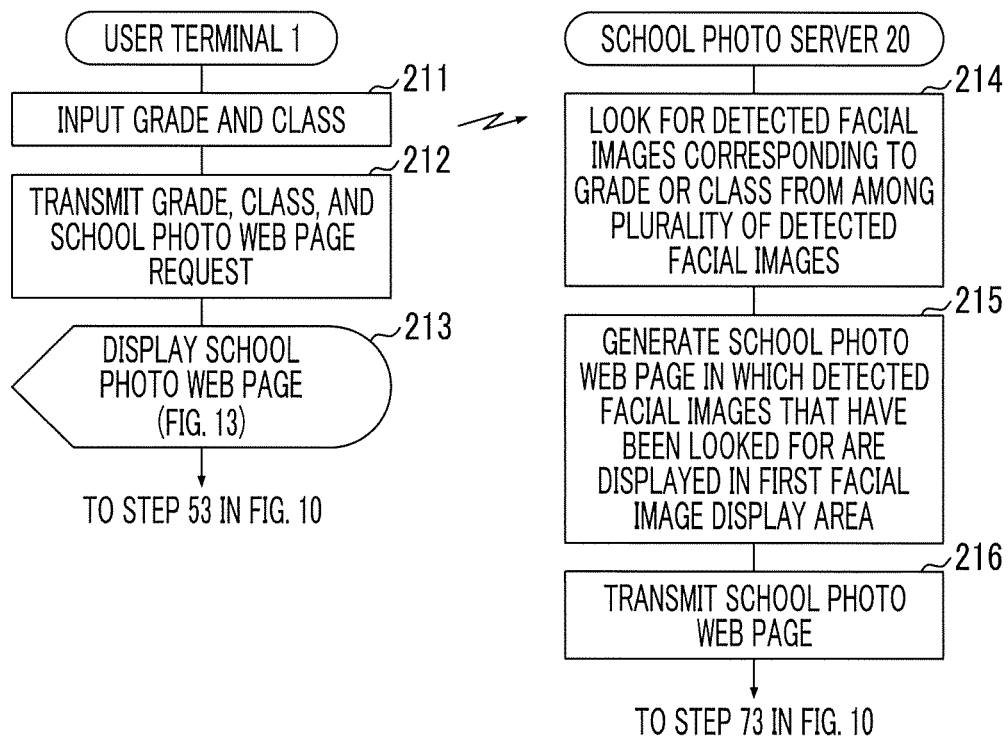
FIG. 40 is a flowchart illustrating a portion of a processing procedure of the school photo system.

FIG. 40 is a flowchart illustrating a portion of the processing procedure of the school photo system. In FIG. 40, a left flowchart illustrates a processing procedure in the user terminal 1, and a right flowchart illustrates a processing procedure in the school photo server 20.

A grade or a class of a person of which a facial image is desired to be looked for is input from the user terminal 1 (step 211), and data indicating the input grade or class and a school photo web page request are transmitted from the user terminal 1 to the school photo server 20 (step 212).

The data indicating the grade or class and the school photo web page request from the user terminal 1 are received in the communication device 22 of the school photo server 20 (the input unit for inputting a grade or a class), and a plurality of detected facial images corresponding to the grade or the class indicated by the received data are looked for from among the plurality of detected facial images stored in the facial image database 25 by the CPU 21 (step 214). A school photo web page in which the plurality of detected facial images that have been looked for are displayed in the first facial image display area 91 is generated by the CPU 21 (step 215), and the generated school photo web page is transmitted to the user terminal 1 (step 216).

If the school photo web page is received in the user terminal 1, a window 90 in which the plurality of detected facial images corresponding to the input grade or class are displayed in the first facial image display area 91 is displayed in the display screen of the display device 4.

Figure 41:
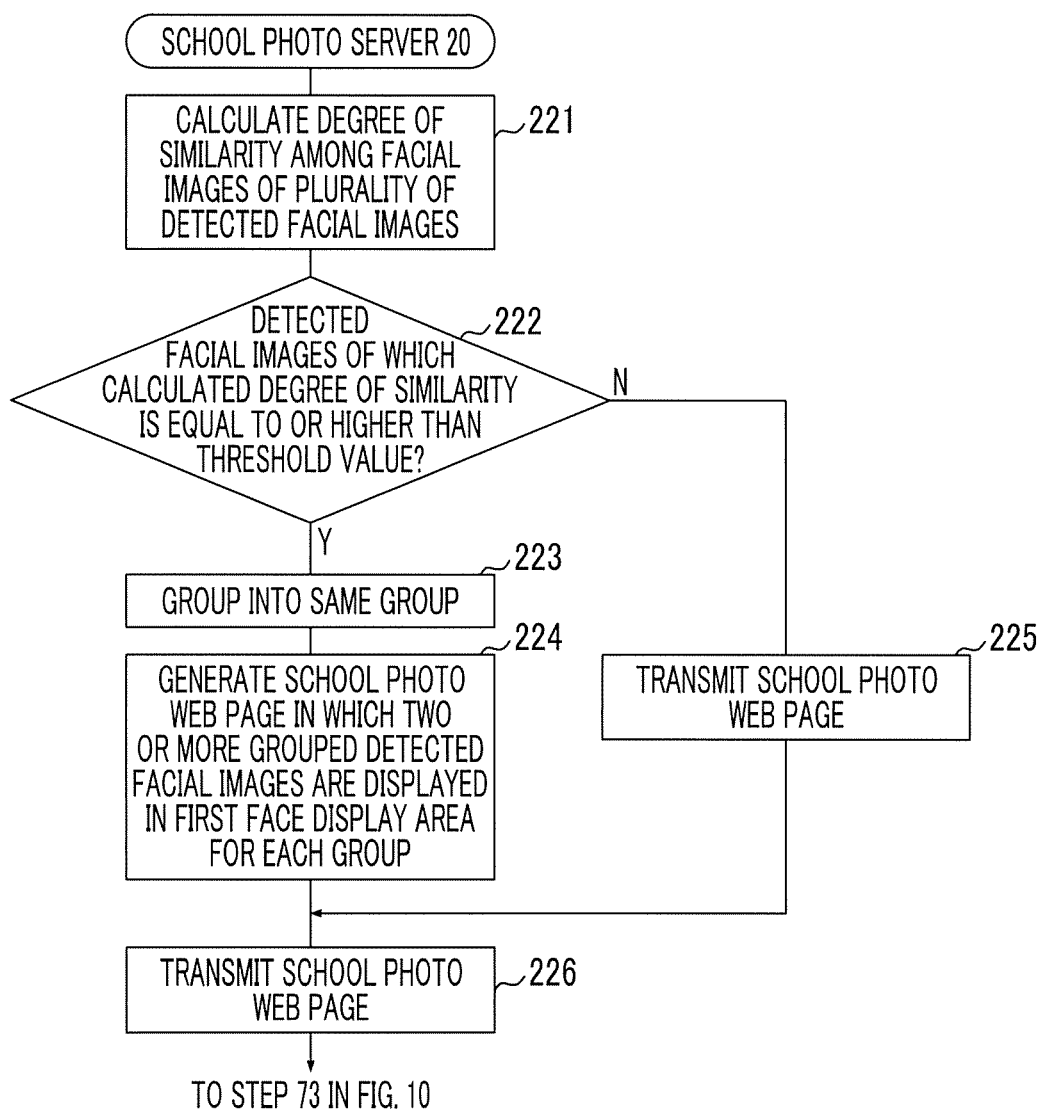
FIG. 41 is a flowchart illustrating a portion of a processing procedure of a school photo server.

FIG. 41 is a flowchart illustrating a portion of the processing procedure of the school photo server 20.

First, a degree of similarity between the facial images of the plurality of detected facial images stored in the facial image database 25 is calculated by the CPU 21 (step 221).

In the case where facial images are the facial images of which the calculated degree of similarity is equal to or greater than a threshold value (YES in step 222), the two or more detected facial images are grouped by the CPU 21 (step 223) (an example of the process of the grouping unit). A school photo web page in which the two or more grouped detected facial images are displayed in the first facial image display area 91 for each group is generated by the CPU 21 (step 224). In a case where facial images are not the facial images of which the calculated degree of similarity is equal to or greater than the threshold value (NO in step 222), a school photo web page in which the detected facial images are displayed in the first facial image display area 91 without being grouped is generated (step 225). The generated school photo web page is transmitted from the school photo server 20 to the user terminal 1 (step 226).

Figure 42:
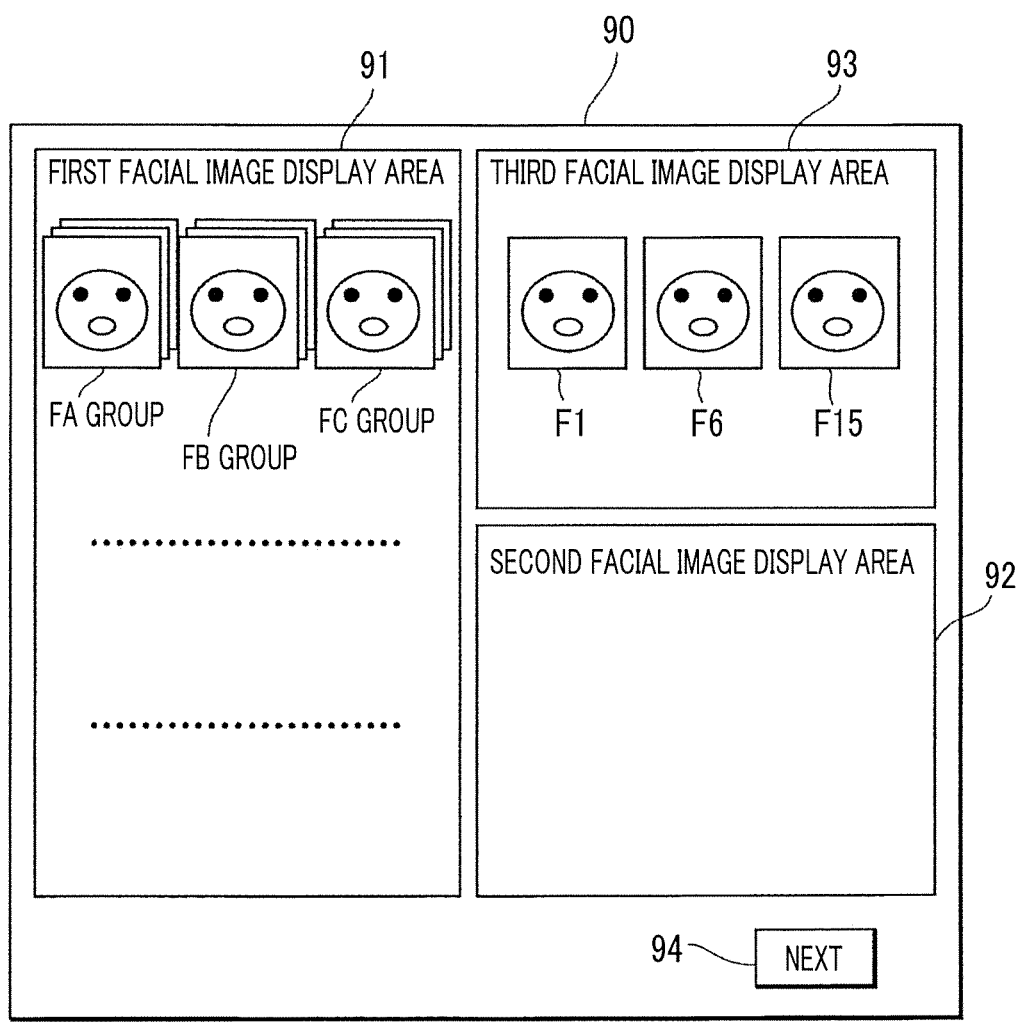
FIG. 42 illustrates an example of a window displayed on the user terminal.

FIG. 42 illustrates an example of the window 90 that is displayed on the school photo web page.

As described above, a plurality of grouped detected facial images are displayed for each group in the first facial image display area 91. The user clicks the group of facial images of a person to be looked for from among the group displayed in the first facial image display area 91 using the mouse of the user terminal 1. Then, data for identifying the clicked group is transmitted from the user terminal 1 to the school photo server 20. If the identification data is received in the school photo server 20, a school photo web page in which facial images included in the clicked group are displayed in the third facial image display area 93 is generated in the school photo server 20. The generated school photo web page is transmitted from the school photo server 20 to the user terminal 1. Then, as illustrated in FIG. 42, a window 90 in which the facial images included in the clicked group are displayed in the third facial image display area 93 is displayed in the display screen of the display device 4.

Figure 43:
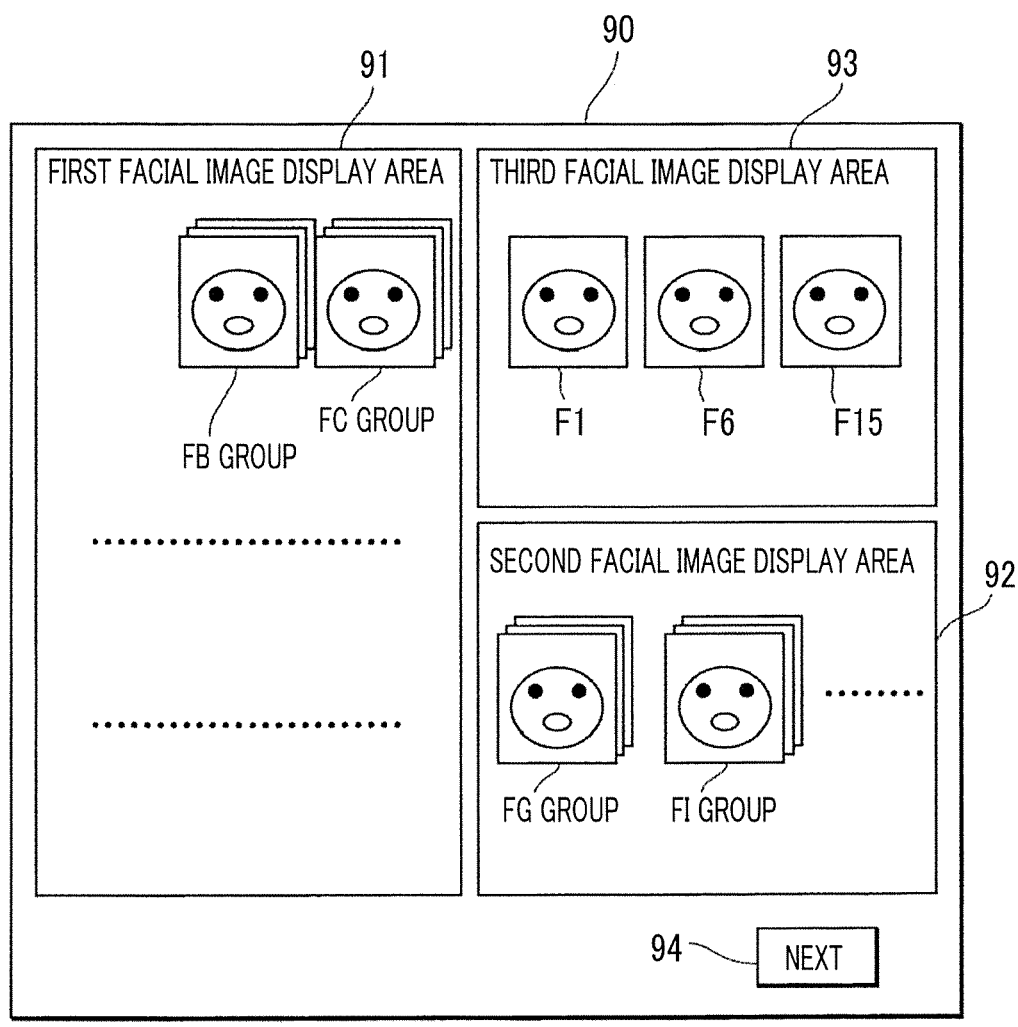
FIG. 43 illustrates an example of a window displayed on the user terminal.

If the facial images (specific facial images, which are facial images F1, F6, and F15 in this case) included in the clicked group are displayed in the third facial image display area 93, a degree of priority between a representative facial image in the plurality of detected facial image groups displayed in the first facial image display area 91 and at least one of the facial images F1, F6, or F15 is calculated. A school photo web page is generated in the school photo server 20 so that top fifteen groups including facial images with a high priority are displayed in the second facial image display area 92. The generated school photo web page is transmitted from the school photo server 20 to the user terminal 1. Then, a group including similar facial image candidates similar to at least one of the specific facial images F1, F6, or F15 displayed in the third facial image display area 93 is displayed in the second facial image display area 92, as illustrated in FIG. 43.

The user clicks the group of facial images similar to the facial image to be looked for from among the groups displayed in the second facial image display area 92 using the mouse. Then, data for identifying the clicked group is transmitted from the user terminal 1 to the school photo server 20, as described above. A school photo web page in which the facial images included in the group specified by the identification data are displayed in the third facial image display area 93 is generated by the CPU 21 of the school photo server 20, and the generated school photo web page is transmitted from the school photo server 20 to the user terminal 1. A window 90 in which the facial images included in the group clicked by the user among the groups displayed in the second facial image display area 92 are displayed in the third facial image display area 93 is displayed in the display screen of the display device 4 of the user terminal 1.

Figure 44:
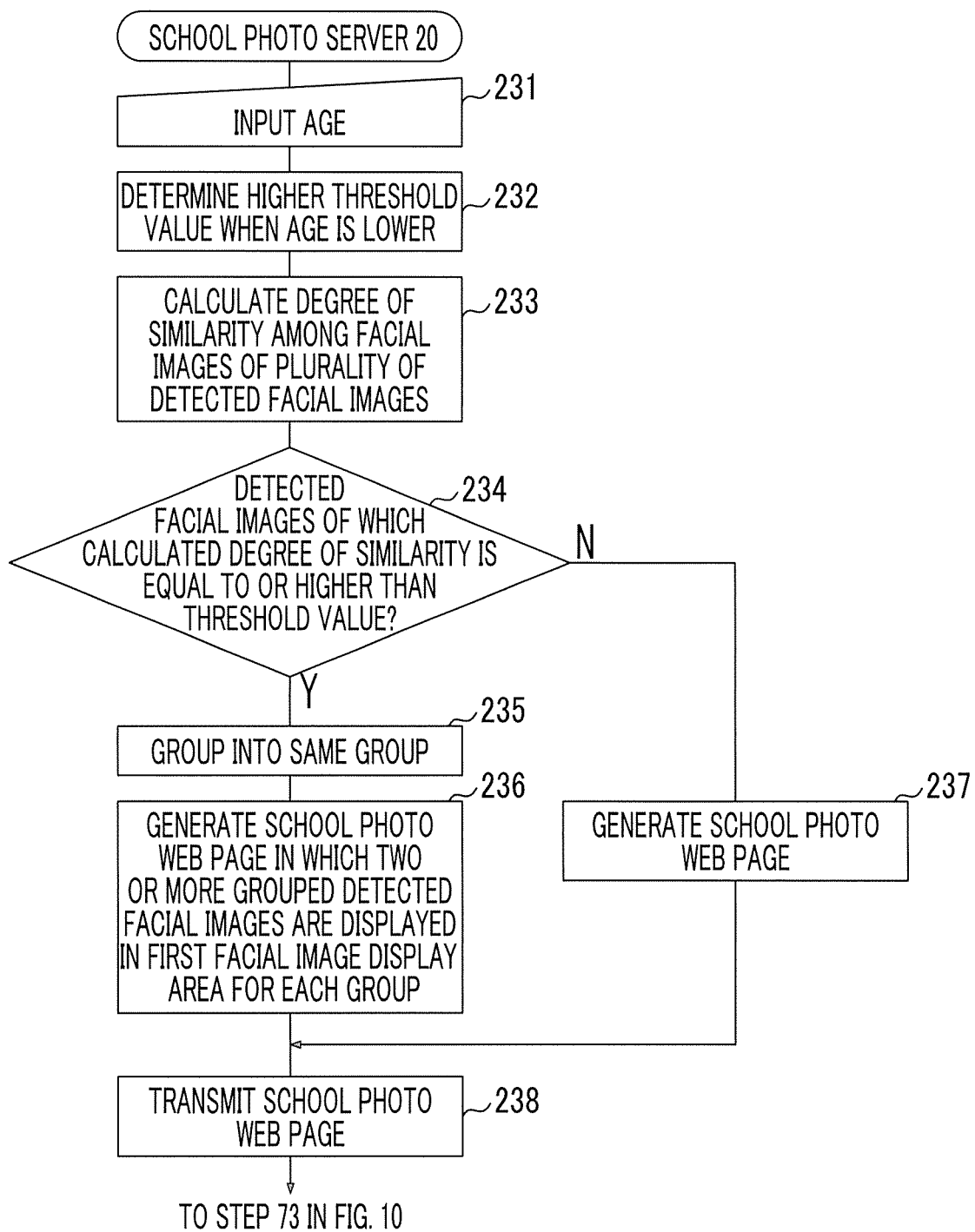
FIG. 44 is a flowchart illustrating a portion of a processing procedure of the school photo server.

FIG. 44 corresponds to FIG. 41 and is a flowchart illustrating a portion of the processing procedure of the school photo server 20. In FIG. 44, the same processes as in FIG. 41 are denoted with the same reference numerals and description thereof will be omitted.

When a photographer, an employee of a photo studio, or the like stores original images in the original image database 24, he or she inputs approximate ages of subjects (for example, an age of a kindergarten children and an age of an elementary school student) using an input device (an example of the age input unit) 26 (step 231). Then, when the input age is lower, a higher threshold value is determined by the CPU 21 (step 232). As described above, a degree of similarity among a plurality of detected facial images are calculated (step 233), and the detected facial image are grouped according to the calculated degree of similarity.

When an age is lower, faces are similar and it is difficult to determine whether persons are the same persons. When an age is lower, a threshold value is increased to prevent erroneous grouping in which faces of others are included in the same group.

Figures 45, 46:
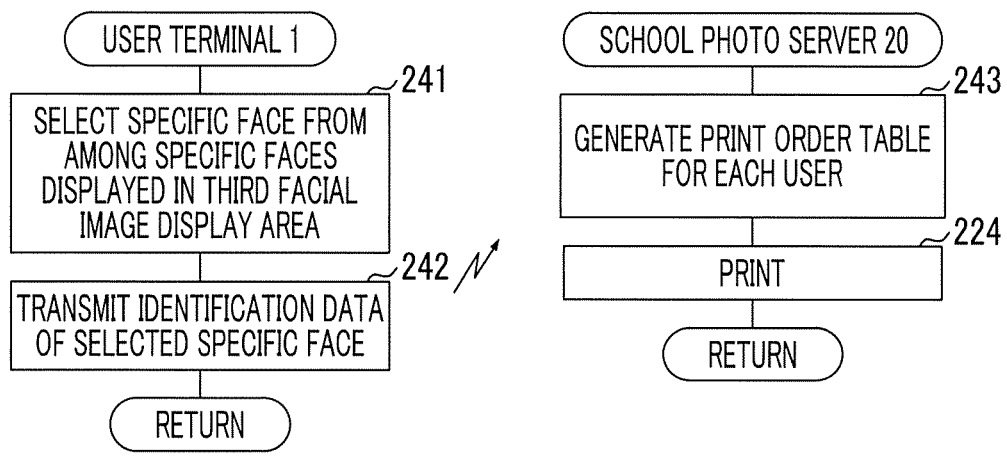
FIG. 45 is a flowchart illustrating a processing procedure of the school photo system.
FIG. 46 is an example of a print order table.

FIG. 45 is a flowchart illustrating the processing procedure of the school photo system. In FIG. 45, a left flowchart illustrates a processing procedure in the user terminal 1, and a right flowchart illustrates a processing procedure in the school photo server 20. This processing procedure is performed after the specific face is determined as described above, and is a processing procedure for the print order.

The facial image (original image) to be printed among the specific facial images displayed in the third facial image display area 93 as described above is clicked and selected (step 241). Then, the identification data of the selected specific facial image and the user ID are transmitted from the user terminal 1 to the school photo server 20 (step 242).

If the identification data and the user ID are received in the school photo server 20, a print order table is generated for each user by the CPU 21 of the school photo server 20 (step 243). The original image including a specific facial image specified by the identification data is printed in the school photo server 20 (step 244). In a case where the original image is printed in the school photo server 20, it goes without saying that a printer is connected to the school photo server 20.

FIG. 46 is an example of a print order table.

The print order table is generated for each user as described above, and presence or absence of an order of the original image including the facial image (a print order), a size of the facial image (for example, a rate to the original image), a position of the facial image, blurriness, a degree of smiling, and a degree of suitability are stored for each item of identification data of the specific facial image selected by the user. The information stored in the print order table is read from the relevant information table, the degree-of-suitability table, or the like, and information not stored in the tables is generated by the CPU 21. Thus, the feature of the printed-order facial image among the specific facial images is stored for each user in the print order table. The print order table is stored in the memory 29 (an example of the feature storage unit).

Figure 47:
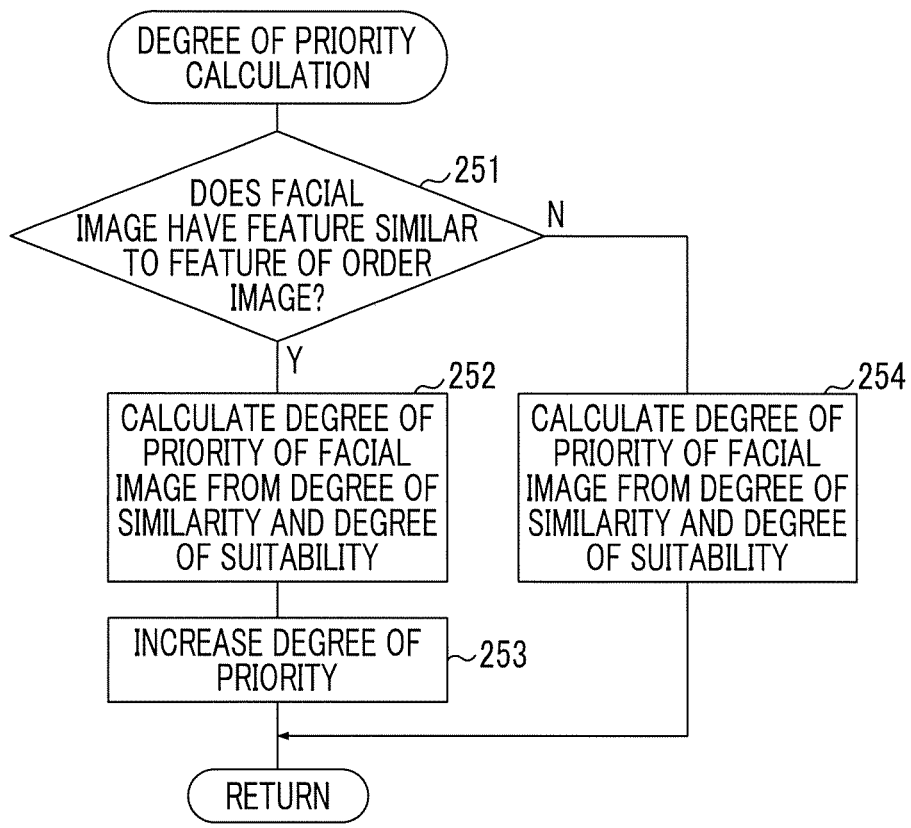
FIG. 47 is a flowchart illustrating a priority determination processing procedure.

FIG. 47 is a flowchart illustrating an example of the degree of priority calculation processing procedure (the processing procedure of step 44 in FIG. 11).

As described above, in the process of looking for a specific facial image, the CPU 21 determines whether a plurality of detected facial images have a feature similar to a feature of a facial image ordered for printing by the user (step 251). If the detected facial images have the similar feature (YES in step 251), the degree of priority calculated from the degree of similarity and the degree of suitability is increased by the CPU 21 (steps 252 and 253) (an example of a process of the fourth priority correction unit). If the detected facial images do not have the similar feature (NO in step 251), correction according to the feature of the print order is not performed on the calculated priority (step 254).

It is easy for the facial image corresponding to an order tendency of the user to be displayed in the second facial image display area 92.

Figure 48:
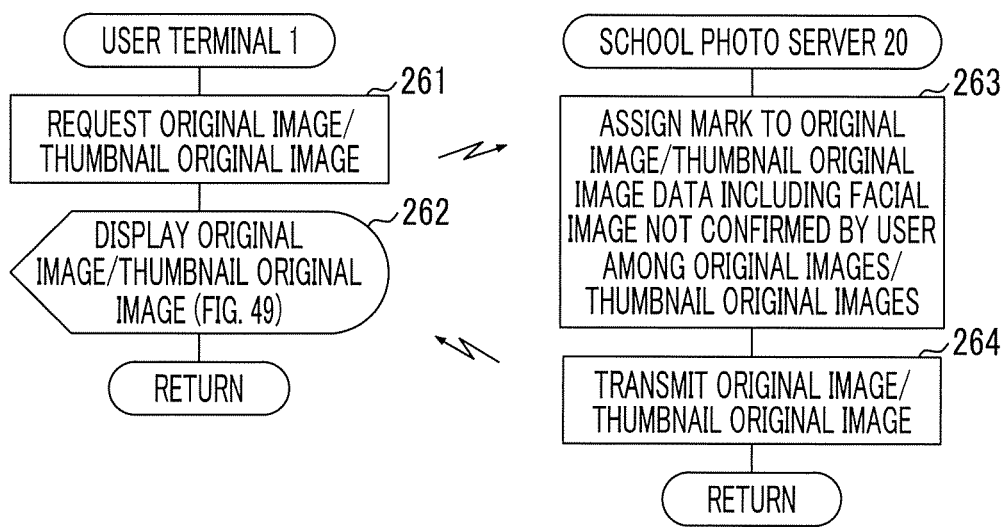
FIG. 48 is a flowchart illustrating a processing procedure of the school photo system.

FIG. 48 illustrates an example of a processing procedure of the school photo system.

The original image/thumbnail original image request is transmitted from the user terminal 1 to the school photo server 20 (step 261). If the request from the user terminal 1 is received in the school photo server 20, data in which the original image and the thumbnail original image data including the facial image not confirmed by the user among the original images and the thumbnail original images are assigned with the mark and displayed is generated by the CPU 21 (step 263). The facial image not confirmed by the user is a facial image that is not displayed in the second facial image display area 92 among the plurality of detected facial images. The data indicating the original image/thumbnail original image assigned with the mark is transmitted from the school photo server 20 to the user terminal 1 (step 264).

If the data transmitted from the school photo server 20 is received in the user terminal 1, the original image or the thumbnail original image assigned with the mark is displayed for the original image or the thumbnail original image not confirmed by the user in the display screen of the display device 4 of the user terminal 1 (step 262).

Figure 49:
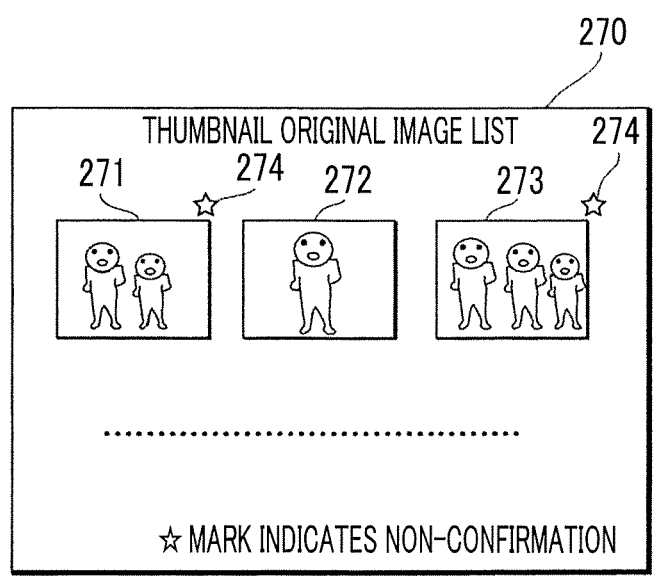
FIG. 49 is an example of a window displayed on the user terminal.

FIG. 49 illustrates an example of a thumbnail original image list window that is displayed in the display screen of the display device 4 of the user terminal 1.

Thumbnail images 271, 272, and 273 are displayed in the window 270. A mark 274 is assigned to the thumbnail images 271 and 273 not confirmed by the user among the thumbnail images 271, 272, and 273. The user can recognize the non-confirmed facial image by viewing the mark 274.

EXPLANATION OF REFERENCES

1: user terminal
20: school photo server
21: CPU
22: communication device
23: communication control device
24: original image database
25: facial image database
26: input device
27: CD-ROM drive
28: CD-ROM
29: memory

What is claimed is:

1. An image display control device, comprising:
a processor, configured to provide instructions to a plurality of units when the instructions are loaded from a memory, wherein the units comprise:
a first display control unit for causing at least one or more facial images among a plurality of detected facial images detected from a plurality of original images to be displayed in a first facial image display area;
a first specific facial image determination unit for determining a facial image designated by a first facial image designation unit from among the at least one or more facial images displayed in the first facial image display area by the first display control unit, as a first specific facial image that is used to look for a facial image similar to the designated facial image;
a second display control unit for causing the detected facial images with a degree of priority calculated for the plurality of detected facial images from a degree of similarity between the respective detected facial images of the plurality of detected facial images and the first specific facial image determined by the first specific facial image determination unit and a degree of suitability indicating a degree suitable for printing, the degree of priority being a degree of priority up to a predetermined number, to be displayed as similar facial image candidates in a second facial image display area;
a second specific facial image determination unit for determining facial images designated by a second facial image designation unit among the facial images displayed in the second facial image display area by the second display control unit, as second specific facial images;
a first updating unit for causing facial images excluding the facial image designated by the first facial image designation unit and the facial images displayed in the second facial image display area from the plurality of detected facial images to be a plurality of new detected facial images;
a control unit for causing the process of the second display control unit and the process of the second specific facial image determination unit to be repeated; and
a first warning unit for warning according to at least two facial images specified by at least one of the first facial image designation unit or the second facial image designation unit being detected from the same original image.

2. The image display control device according to claim 1, wherein the units further comprise:
a third display control unit for causing the facial images designated by the second facial image designation unit to be displayed in a third facial image display area.

3. The image display control device according to claim 1, wherein the degree of priority is calculated for the plurality of detected facial images from a degree of similarity to the at least one or more specific facial images among the first specific facial image determined by the first specific facial image determination unit and the second specific facial images determined by the second specific facial image determination unit and the degree of suitability.

4. The image display control device according to claim 1, wherein the second display control unit causes the detected facial images to be displayed in the second facial image display area in a descending order of the degree of priority.

5. The image display control device according to claim 1, wherein the units further comprise:
a second warning unit for warning according to a facial image already designated by a second user different from a first user designating the facial image using the first facial image designation unit or the second facial image designation unit being designated by the first user using the first facial image designation unit or the second facial image designation unit.

6. The image display control device according to claim 1, wherein the units further comprise:
a first priority correction unit for lowering a degree of priority of a facial image already designated by a second user different from a first user designating the facial image using the first facial image designation unit or the second facial image designation unit.

7. The image display control device according to claim 1, wherein the units further comprise:
a second updating unit for causing facial images remaining by excluding a facial image already designated by a second user different from a first user designating the facial image using the first facial image designation unit or the second facial image designation unit from the plurality of detected facial images, to be the plurality of new detected facial images.

8. The image display control device according to claim 1, wherein the units further comprise:
a second degree of priority correction unit for lowering a degree of priority of facial images remaining by excluding facial images determined as specific facial images among the facial images included in an original image from which the facial images determined as the specific facial images is detected.

9. The image display control device according to claim 1, wherein the units further comprise:
a deletion unit for deleting facial images remaining by excluding facial images determined as specific facial images among the facial images included in an original image from which the facial images determined as the specific facial images is detected, from the plurality of facial images.

10. The image display control device according to claim 1, wherein the units further comprise:

a third priority correction unit for lowering the degree of priority of a plurality of facial images included in the same image when the degree of suitability is lower.

11. The image display control device according to claim 1,
wherein the second display control unit causes the detected facial images with a degree of priority calculated for the plurality of detected facial images from a degree of similarity to a specific facial image determined in a previous process of the image display control device and the degree of suitability, the degree of priority being a degree of priority up to a predetermined number, to be displayed as the similar facial image candidates in the second facial image display area.

12. The image display control device according to claim 1, wherein the units further comprise:
a facial image detection unit for detecting the facial images from the plurality of original images inputted into the processor and obtaining the plurality of detected facial images; and
a degree of suitability calculation unit for calculating the degree of suitability for the respective facial images of the plurality of detected facial images detected by the facial image detection unit.

13. The image display control device according to claim 1,
wherein the first display control unit causes the at least one or more facial images among the plurality of detected facial images detected from a set image in which a plurality of faces are reflected, to be displayed in the first facial image display area.

14. The image display control device according to any one of claim 1, wherein the units further comprise:
a expected number calculation unit for calculating an expected number of the facial images that are designated by the second facial image designation unit among the facial images included in the plurality of detected facial image that are caused to be the plurality of new detected facial images by the first updating unit; and
a fourth display control unit for causing the expected number of the facial images calculated by the expected number calculation unit to be displayed.

15. The image display control device according to claim 14, wherein the units further comprise:
a third warning unit for warning according to the expected number of the facial images calculated by the expected number calculation unit being equal to or smaller than a predetermined number.

16. The image display control device according to claim 2, wherein the units further comprise:
a fifth display control unit for causing an original image including the facial images displayed in the third facial image display area or a thumbnail image of the original image to be displayed with an assigned mark.

17. The image display control device according to claim 1, wherein the units further comprise:
a sixth display control unit for assigning a mark to the specific facial images and displaying the mark around an original image from which the specific facial images is detected.

18. The image display control device according to claim 1,
wherein the first display control unit causes the plurality of detected facial images obtained from persons belonging to a grade or a class inputted into the processor to be displayed in the first facial image display area.

19. The image display control device according to claim 1, wherein the units further comprise:
a grouping unit for grouping two or more detected facial images having a degree of similarity equal to or greater than a threshold value among the plurality of detected facial images,
wherein the second display control unit causes the two or more detected facial images grouped by the grouping unit to be displayed in the second facial image display area for each group.

20. The image display control device according to claim 19,
wherein the grouping unit increases the threshold value when an age inputted into the processor is lower.

21. The image display control device according to claim 1, wherein the units further comprise:
a feature storage memory for storing a feature of a print-ordered facial image among the specific facial images, for each user; and
a fourth priority correction unit for increasing the degree of priority of the facial image with the feature corresponding to a user operating the image display control device among the features stored in the feature storage memory.

22. The image display control device according to claim 16,
wherein the fifth display control unit assigns a mark to a portion of the facial image displayed in the third facial image display area, and causes the original image or the thumbnail of the original image including the facial image displayed in the third facial image display area to be displayed.

23. The image display control device according to claim 1, wherein the units further comprise:
a seventh display control unit for causing a non-confirmed original image that is an original image including respective facial images among the plurality of new detected facial images obtained by the first updating unit or a non-confirmed thumbnail original image that is a thumbnail original image of the original image to be displayed with an assigned mark indicating non-confirmation, or causing the facial image included in the plurality of new detected facial images among the non-confirmed original images or the non-confirmed thumbnail original images to be displayed with an assigned mark indicating non-confirmation.

24. The image display control device according to claim 1, wherein the units further comprise:
an eighth display control unit for causing the facial images included in the plurality of new detected facial images obtained by the first updating unit to be displayed with a mark assigned around an original image from which the facial images is detected.

25. An image display control method, comprising:
causing, by a first display control unit, at least one or more facial images among a plurality of detected facial images detected from a plurality of original images to be displayed in a first facial image display area;
determining, by a first specific facial image determination unit, a facial image designated by a first facial image designation unit from among the at least one or more facial images displayed in the first facial image display area by the first display control unit, as a first specific facial image that is used to look for a facial image similar to the designated facial image;

causing, by a second display control unit, the detected facial images with a degree of priority calculated for the plurality of detected facial images from a degree of similarity between the respective detected facial images of the plurality of detected facial images and the first specific facial image determined by the first specific facial image determination unit and a degree of suitability indicating a degree suitable for printing, the degree of priority being a degree of priority up to a predetermined number, to be displayed as similar facial image candidates in a second facial image display area;

determining, by a second specific facial image determination unit, facial images designated by a second facial image designation unit among the facial images displayed in the second facial image display area by the second display control unit, as second specific facial images;

causing, by a first updating unit, facial images excluding the facial image designated by the first facial image designation unit and the facial images displayed in the second facial image display area from the plurality of detected facial images to be a plurality of new detected facial images;

causing, by a control unit, the process of the second display control unit and the process of the second specific facial image determination unit to be repeated; and warning, by a warning unit, according to at least two facial images specified by at least one of the first facial image designation unit or the second facial image designation unit being detected from the same original image.

26. A non-transitory computer readable recording medium storing a program for controlling a computer of an image display control device, the program causing the computer to perform functions comprising:

causing at least one or more facial images among a plurality of detected facial images detected from a plurality of original images to be displayed in a first facial image display area;

determining a facial image designated by a first facial image designation unit from among the at least one or more facial images displayed in the first facial image display area, as a first specific facial image that is used to look for a facial image similar to the designated facial image;

causing the detected facial images with a degree of priority calculated for the plurality of detected facial images from a degree of similarity between the respective detected facial images of the plurality of detected facial images and the determined first specific facial image and a degree of suitability indicating a degree suitable for printing, the degree of priority being a degree of priority up to a predetermined number, to be displayed as similar facial image candidates in a second facial image display area;

determining facial images designated by a second facial image designation unit among the facial images displayed in the second facial image display area, as second specific facial images;

causing facial images excluding the facial image designated by the first facial image designation unit and the facial images displayed in the second facial image display area from the plurality of detected facial images to be a plurality of new detected facial images;

causing the process to cause the detected facial images with the degree of priority up to the predetermined number to be displayed as the similar facial image candidates in the second facial image display area, and the process to determine the facial image designated by the second facial image designation unit among the facial images displayed in the second facial image display area as the specific facial images, to be repeated; and warning according to at least two facial images specified by at least one of the first facial image designation unit or the second facial image designation unit being detected from the same original image.

* * * * *